(12) United States Patent
Bellamkonda et al.

(10) Patent No.: US 11,647,457 B2
(45) Date of Patent: *May 9, 2023

(54) SYSTEMS AND METHODS FOR PERFORMANCE-AWARE ENERGY SAVING IN A RADIO ACCESS NETWORK

(71) Applicant: Verizon Patent and Licensing Inc., Basking Ridge, NJ (US)

(72) Inventors: Krishna K. Bellamkonda, Flower Mound, TX (US); Nischal Patel, Hillsborough, NJ (US); Jin Yang, Orinda, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/804,619

(22) Filed: May 31, 2022

(65) Prior Publication Data

US 2022/0295396 A1      Sep. 15, 2022

Related U.S. Application Data

(63) Continuation of application No. 17/107,511, filed on Nov. 30, 2020, now Pat. No. 11,382,033.

(51) Int. Cl.
*H04W 52/02* (2009.01)
*H04B 7/06* (2006.01)
*H04B 7/08* (2006.01)
*H04W 28/02* (2009.01)

(52) U.S. Cl.
CPC ...... *H04W 52/0206* (2013.01); *H04B 7/0617* (2013.01); *H04B 7/086* (2013.01); *H04W 28/0268* (2013.01)

(58) Field of Classification Search
CPC ......... H04W 52/0206; H04W 28/0268; H04W 88/08; H04W 28/24; H04W 52/02; H04W 28/08; H04W 52/0203; H04W 52/0274; H04B 7/086
See application file for complete search history.

(56) References Cited

U.S. PATENT DOCUMENTS

| | | |
|---|---|---|
| 11,134,402 B1 | 9/2021 | Boyapati et al. |
| 2013/0188618 A1* | 7/2013 | Dinan ............... H04L 5/0094 370/336 |
| 2017/0064579 A1* | 3/2017 | Park ..................... H04W 8/04 |
| 2020/0314745 A1 | 10/2020 | Yi et al. |
| 2020/0314748 A1 | 10/2020 | Kim et al. |
| 2021/0037420 A1* | 2/2021 | Gulati ............. H04W 28/0967 |
| 2021/0037484 A1 | 2/2021 | Zhou et al. |

(Continued)

*Primary Examiner* — Mewale A Ambaye

(57) ABSTRACT

A system described herein may provide for the use of artificial intelligence/machine learning ("AI/ML") techniques to model energy usage information and energy saving techniques in various locations or regions (e.g., sectors) associated with one or more radio access networks ("RANs") of a wireless network. The system may determine energy saving techniques, such as radio frequency ("RF") transmission modification in time and/or frequency domains, antenna mode modification, cell sleep mode, beamforming parameters, and/or other suitable techniques to modify energy consumption at such sectors. The system may balance energy savings with maintaining Quality of Service ("QoS") metrics at an acceptable level.

20 Claims, 11 Drawing Sheets

(56) References Cited

U.S. PATENT DOCUMENTS

| | | | |
|---|---|---|---|
| 2021/0076326 A1* | 3/2021 | Aki | H04W 52/0229 |
| 2021/0112441 A1* | 4/2021 | Sabella | H04L 67/12 |
| 2021/0409173 A1 | 12/2021 | Chatterjee et al. | |
| 2021/0409335 A1* | 12/2021 | Zhu | H04L 47/24 |
| 2021/0410107 A1 | 12/2021 | Park et al. | |

* cited by examiner

SYSTEMS AND METHODS FOR PERFORMANCE-AWARE ENERGY SAVING IN A RADIO ACCESS NETWORK

CROSS-REFERENCE TO RELATED APPLICATION

This Application is a Continuation of U.S. patent application Ser. No. 17/107,511, filed on Nov. 30, 2020, titled "SYSTEMS AND METHODS FOR PERFORMANCE-AWARE ENERGY SAVING IN A RADIO ACCESS NETWORK," the contents of which are herein incorporated by reference in their entirety.

BACKGROUND

Wireless networks, such as Long-Term Evolution ("LTE") networks, Fifth Generation ("5G") networks, or the like, may include radio access networks ("RANs"), via which user equipment ("UE"), such as mobile telephones or other wireless communication devices, may receive wireless service. RANs may include antennas, radio, or the like, which may consume energy (e.g., electrical power over a period of time) in order to provide wireless service.

DETAILED DESCRIPTION OF THE PREFERRED EMBODIMENTS

Figure 1A:
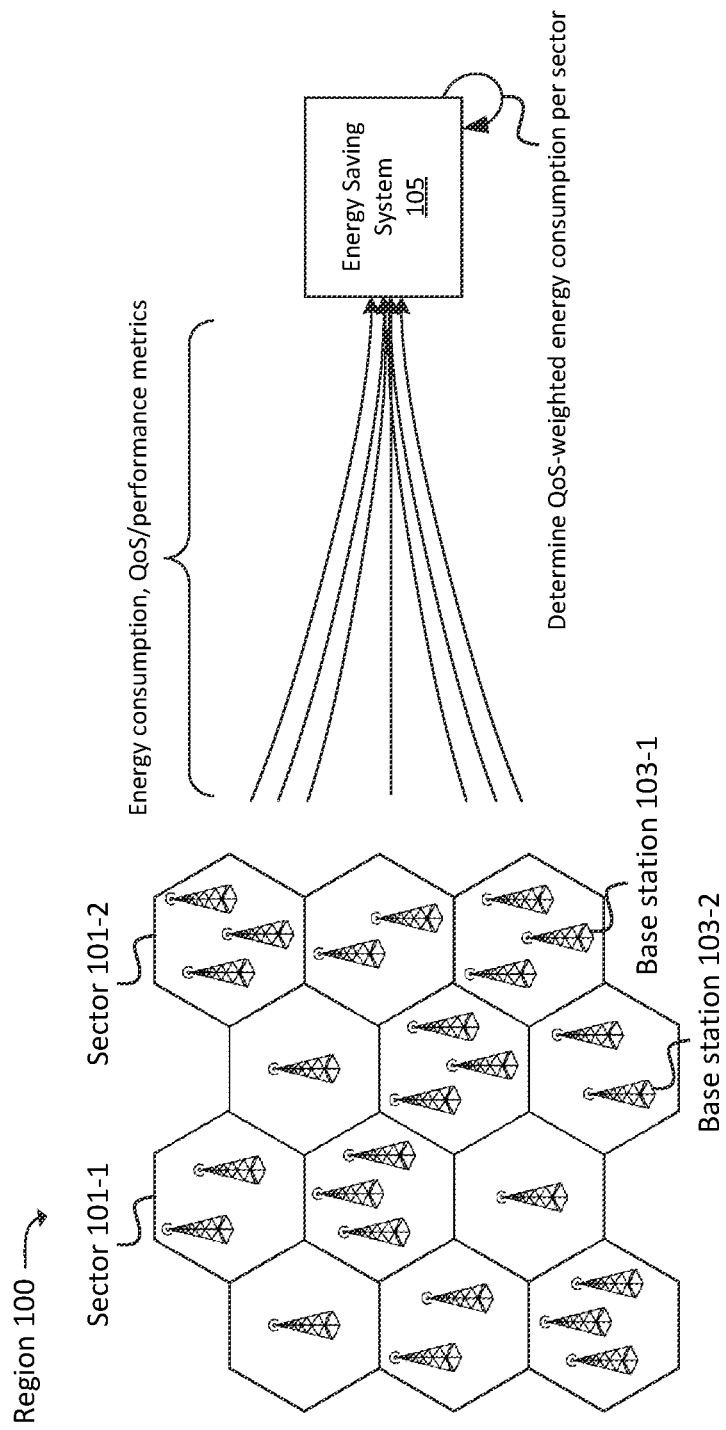
FIG. 1A illustrates an example of determining weighted energy consumption on a per-sector basis in a RAN that includes multiple sectors, in accordance with some embodiments.

The following detailed description refers to the accompanying drawings. The same reference numbers in different drawings may identify the same or similar elements.

Embodiments described herein provide for the use of AI/ML techniques to model energy usage information in various locations or regions associated with one or more RANs of a wireless network (e.g., a LTE network, a 5G network, and/or another type of network). As discussed herein, such locations or regions may be referred to as "sectors." Further, in the examples discussed herein, sectors may include evenly distributed areas of a uniform shape (e.g., a hexagon). In practice, sectors may be arranged or defined differently. For example, in some embodiments, sectors may be defined with respect to the location of one or more base stations of a RAN (e.g., where a sector may be defined based on a coverage area of the one or more base stations and/or may be defined based on a physical location at which one or more antennas or other physical equipment of the base stations are installed), and/or may be defined independently of the location of the one or more base stations.

As described herein, one or more scores, metrics, etc. (referred to herein simply as "scores" for the sake of brevity) may be determined (e.g., using AI/ML techniques and/or other suitable techniques) based on energy consumption information by base stations or other equipment associated with the RANs. In some embodiments, the scores may reflect a per-sector consumption of energy over a given period of time. In some embodiments, the scores may include one or more weighted scores, which may be generated based on measures of energy consumption and one or more other factors.

For example, as discussed below, such other factors for a given sector may include QoS or other performance metrics associated with the sector, which may include latency, bandwidth, jitter, dropped calls, etc. experienced by UEs located within the sector. In some embodiments, such other factors may include attributes or characteristics of the RAN, including attributes or characteristics of one or more base stations in the sector and/or attributes or characteristics of one or more base stations in neighboring (e.g., directly adjacent to, or within a threshold distance of) sectors. As discussed below, such attributes or characteristics may include a quantity of base stations in a given sector, radio access technologies ("RATs") implemented in the sector, quantities of antennas or other type of wireless infrastructure in the sector, signal quality or other radio frequency ("RF") metrics (e.g., radio transmission power, RF interference, Signal-to-Interference-and-Noise-Ratio ("SINR"), or the like), location information associated with particular base stations within the sector, and/or other RAN or RF-related information.

In some embodiments, the factors based on which per-sector consumption scores may be generated or otherwise based on my include locale features, such as attributes and/or features of a geographical area that corresponds to given sectors. For example, locale features may include information relating to building layout and/or density, topographical features (e.g., mountains, valleys, forests, streams, etc.), weather-related information, air quality-related information (e.g., smog density, particulate density, fog density, etc.), and/or other factors associated with a given geographical area.

For example, as shown in FIG. 1A, geographical area (or region) 100 may be subdivided into a set of sectors 101. The set of sectors 101 may include, as shown, sector 101-1, 101-2, and one or more additional sectors that are not explicitly illustrated with a reference numeral.

Further in this example, each sector 101 may be associated with particular base stations 103. For example, base station 103-1 may be located in one particular sector 101, while base station 103-2 may be located in another sector 101. Further, additional base stations 103 (e.g., base stations not explicitly illustrated with a reference numeral) may be present in geographical region 100. That is, the location of each base station 103 may be within a particular geographical area (e.g., a hexagonal-shaped geographical area, in this example) that corresponds to a respective sector 101. For the sake of example, each sector 101 is associated with at least one base station 103. In practice, one or more sectors 101 may not include any base stations 103.

As shown, Energy Saving System 105 may receive energy consumption metrics, QoS and/or performance metrics (referred to herein as "QoS metrics" for the sake of brevity), and/or other information (as described below), indicating measures of energy consumption by base station 103 (and/or other types of devices or systems) at particular sectors 101, as well as QoS information associated with UEs that are located within respective sectors 101. For example, Energy Saving System 105 may communicate with base stations 103 of sectors 101 and/or UEs located within such sectors 101 via an application programming interface ("API") and/or other suitable communication pathway, in order to receive such information. For example, base stations 103 and/or UEs may "push" such information to Energy Saving System 105 (e.g., via the API) on a periodic or intermittent basis, upon the occurrence of trigger events (e.g., one or more QoS metrics exceeding a threshold value, a connection or disconnection of one or more UEs to one or more base stations 103, and/or other events), and/or on some other basis. In some embodiments, Energy Saving System 105 may "pull" (e.g., request or otherwise obtain) such information from the UEs, base stations 103, and/or other device or system that receives, collects, maintains, and/or provides such information. For example, Energy Saving System 105 may be communicatively coupled to a Service Capability Exposure Function ("SCEF") of a core network associated with base stations 103, a Network Exposure Function ("NEF"), and/or other suitable device, system, function, etc.

In some embodiments, and as discussed below, Energy Saving System 105 may receive and/or obtain information in addition to, or in lieu of, QoS metrics associated with sectors 101. Based on the received information (e.g., per-sector energy consumption information over one or more time periods, per-sector QoS metrics over the one or more time periods, etc.), Energy Saving System 105 may determine (e.g., calculate, compute, etc.) one or more weighted scores for each sector. For example, Energy Saving System 105 may generate an energy consumption score for a particular sector 101 that reflects a measure of power (e.g., Watt-hours or other measures of power or energy consumption) consumed by base stations 103 or other equipment located in sector 101 over a period of time. In some embodiments, the energy consumption score may be or may include a raw value that indicates the amount of power used over the period of time (e.g., a quantity of Watt-hours), a normalized score (e.g., a value between 1-100 or some other scale), or some other value that is derived from or is indicative of energy consumption at the given sector 101.

As noted above, Energy Saving System 105 may generate a weighted energy consumption score based on QoS metrics associated with the same period of time that corresponds to particular energy consumption scores. For example, in some embodiments, Energy Saving System 105 may generate one or more scores based on QoS metrics (e.g., throughput, latency, jitter, etc.) provided by or otherwise associated with UEs in sector 101 during the given time period. The scores may be or may include raw values that correspond to particular QoS metrics (e.g., milliseconds of latency, amounts and/or rates of uplink and/or downlink data, and/or other QoS metrics) experienced by UEs (e.g., individually or as a group) located in sector 101.

In some embodiments, Energy Saving System 105 may generate a QoS-weighted energy consumption score for sector 101, associated with a given time period, based on the energy consumption values and/or scores associated with sector 101 over the given time period, the QoS metrics and/or scores over the given time period, and/or one or more other factors discussed below. For example, as discussed below, Energy Saving System 105 may modify a given energy consumption score (to generate a QoS-weighted energy consumption score) for a given sector 101 based on a QoS score. For example, Energy Saving System 105 may average the QoS score and the energy consumption score, may select the higher of the QoS score or the energy consumption score, may select the lower of the QoS score or the energy consumption score, may conditionally compute the QoS-weighted energy consumption score based on different conditions. In one example, Energy Saving System 105 may use one technique for generating the QoS-weighted energy consumption score if the QoS score exceeds a threshold, and may use a different technique for generating the QoS-weighted energy consumption score if the QoS score does not exceed the threshold.

Figure 1B:
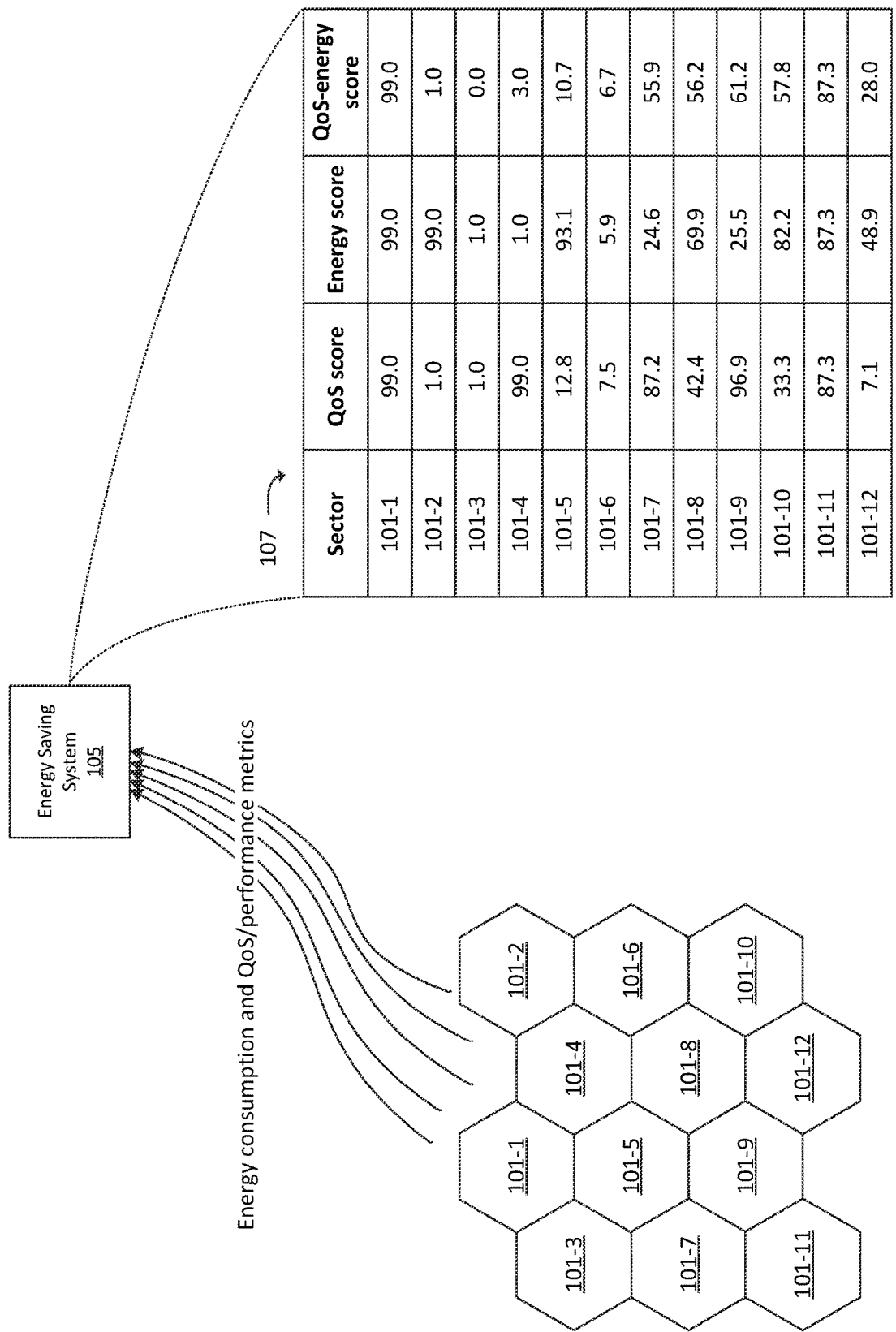
FIG. 1B illustrates an example data structure that may reflect weighted energy consumption associated with sectors of a RAN, in accordance with some embodiments.

As shown in FIG. 1B, for example, Energy Saving System 105 may receive energy consumption information and QoS metrics associated with sectors 101-1 through 101-12 over a particular period of time. Based on the received information, Energy Saving System 105 may generate one or more scores as reflected in example data structure 107. While data structure 107 is visualized here as a table, in practice, the information shown here may be generated or maintained by Energy Saving System 105 in some other suitable format or manner.

As shown, for example, data structure 107 may include one or more scores for each given sector 101. In this example, the scores for each sector 101 may include a QoS score, an energy consumption score (or, simply, "energy score"), and a QoS-weighted energy score (or, simply, "QoS-energy score"). In practice, data structure 107 may include additional, fewer, and/or different scores or values.

In this example, data structure 107 may include, for sector 101-1 over the given time period, a QoS score of 99.0, an energy score of 99.0, and a resultant QoS-energy score of 99.0. For example, the QoS score may indicate a relatively high QoS level associated with sector 101-1. For example, UEs located within sector 101-1 during the time period may have experienced relatively high levels of throughput, relatively low levels of latency and/or jitter, etc. In some embodiments, such metrics may be "relatively" high or low in comparison to a static threshold. In some embodiments, the metrics may be "relatively" high or low in comparison to one or more dynamic thresholds, such as thresholds that vary with time of day, service levels agreements ("SLAs")

associated with UEs and/or base stations 103 in sector 101-1, and/or other factors based on which QoS thresholds may change.

Similarly, the energy score, for sector 101-1 over the particular period of time, may indicate a relatively high level of energy consumption at sector 101-1. In the examples provided herein, that is, a higher energy score indicates a relatively higher level of energy consumption. In some embodiments, the energy consumption may be "relatively" higher than a static threshold, and/or may be "relatively" higher than one or more dynamic thresholds, which may be based on characteristics or attributes of particular sectors 101-1 (e.g., quantity of base stations 103 and/or other physical infrastructure located in sector 101-1 or other attributes).

As further shown, the QoS-energy score for sector 101-1 (i.e., 99.0 in this example) may be generated by Energy Saving System 105 based on the QoS score and the energy score (i.e., 99.0 for each score in this example). For example, the QoS-energy score may be the average of the QoS score and the energy score, and/or may be computed or determined in some other way. In this example, as the QoS score and the energy score are equal, the QoS-energy score may be equal to the QoS score and the energy score. In some embodiments, the QoS-energy score may be different (e.g., higher) in such a scenario.

As discussed below, the QoS-energy score may be used by Energy Saving System 105 to identify particular sectors 101 that are candidates for particular energy savings techniques, such as modifying RF transmissions associated with base stations 103 located in sectors 101 on a time and/or frequency domain, modifying beam configurations associated with base stations 103 located in sectors 101, and/or performing other energy saving measures. Generally speaking, for example, a higher QoS-energy score may be associated with more exhaustive energy saving measures than a lower QoS-energy score.

For example, the QoS-energy score of 99.0 of sector 101-1 may be associated with situations in which sector 101-1 exceeds threshold QoS metrics by a relatively large margin, and where energy consumption associated with sector 101-1 also exceeds threshold energy consumption metrics by a relatively large margin. Generally speaking, some energy saving measures may be associated with varying degrees of negative impact to QoS metrics (e.g., increased latency, reduced throughput, reduced coverage area, or the like) and a corresponding positive impact on energy consumption (e.g., reduced energy consumption). Thus, the example QoS-energy score of 99.0 for sector 101-1 may denote that sector 101-1 may be a candidate for relatively intensive energy saving measures.

In some embodiments, the relatively high QoS-energy score may be associated with a previously implemented set of energy savings techniques. In this example, the relatively high QoS-energy score may indicate that the previously implemented set of energy saving techniques may be augmented by additional energy saving techniques, different parameters should be applied to currently implemented energy saving techniques, and/or that a different set of energy savings techniques should be used. In some embodiments, Energy Saving System 105 may generate or modify one or more models (e.g., using AI/ML techniques) based on the determination that a particular set of energy savings techniques provide relatively favorable results (e.g., the QoS-energy score of 99.0 in this example).

On the other hand, the relatively low QoS score of 1.0 for sector 101-2, for example, may be indicative of QoS metrics that are below one or more static and/or dynamic thresholds, such as excessively high latency, excessively low throughput, etc. Thus, although the energy score for sector 101-2 is relatively high (e.g., associated with high energy consumption at sector 101-2), the resulting QoS-energy score for Energy Saving System 105 may be relatively low (e.g., 1.0), as sector 101-2 may not be a viable candidate for energy saving measures. For example, as noted above, performing additional energy saving measures may further degrade the user experience of UEs located in sector 101-2, as QoS metrics may be further reduced by performing such measures.

In some embodiments, Energy Saving System 105 may instruct base stations 103 located in sector 101-2 to remove the performance of already-implemented energy saving techniques based on the relatively low QoS-energy score, in situations where such base stations 103 are performing any such techniques. For example, Energy Saving System 105 may have previously instructed such base stations 103 to perform certain energy saving techniques, which may have resulted in the relatively poor QoS performance. Additionally, or alternatively, conditions may have changed (e.g., additional UEs may have entered sector 101-2, radio configurations of surrounding sectors 101 may have changed, etc.), which may have caused a previously appropriate set of energy savings techniques to no longer yield the intended result (e.g., as indicated by the relatively low QoS-energy score). In some embodiments, Energy Saving System 105 may generate or modify one or more models (e.g., using AI/ML techniques) based on the determination that a particular set of energy savings techniques provide relatively poor results (e.g., the QoS-energy score of 1.0 in this example).

As further shown, data structure 107 may include information for sector 101-3, indicating that sector 101-3 is associated with a relatively low QoS score and a relatively low energy score (e.g., 1.0 for both scores, in this example). In this example, the resultant QoS-energy score may be 0.0, which may reflect no possibly energy saving techniques to be applied to sector 101-3 based on the QoS metrics and energy consumption metrics associated with sector 101-3. For example, the relatively low QoS metrics associated with sector 101-3 (as indicated by the QoS score of 1.0) may indicate that further energy reduction at sector 101-3 would further reduce QoS metrics associated with sector 101-3. Further, the power consumption of sector 101-3 may be so low (as indicated by the energy score of 1.0), that further energy savings may be unfeasible or impossible. Thus, the QoS-energy score of 0.0 may be lower than the average of the QoS score and the energy score for sector 101-3 (which would be 1.0, in this example). For example, Energy Saving System 105 may determine that the QoS score is below a first threshold value, may determine that the energy score is below a second threshold value, and/or may apply one or more other conditions or analyses to compute the QoS-energy score for sector 101-3.

As yet another example, data structure 107 may include information for sector 101-4, indicating that sector 101-4 is associated with a relatively high QoS score (99.0 in this example) and a relatively low energy score (1.0 in this example). In this example, the resultant QoS-energy score (3.0 in this example) may be more heavily based on the energy score than the QoS score. For example, Energy Saving System 105 may determine that the energy score is below a threshold value, and may accordingly weight the energy score more heavily than the QoS score when generating the QoS-energy score. As similarly discussed above, the threshold value may be a static value, and/or may be adjusted dynamically (e.g., where the adjustments are based on AI/ML techniques or other suitable techniques). Generally speaking, the relatively high QoS score and relatively low energy score for sector 101-4 may indicate that QoS metrics associated with sector 101-4 meet or exceed threshold values, and that energy consumption at sector 101-4 is relatively low (e.g., to the point where further energy savings are impractical or impossible).

Data structure 107 includes further QoS scores, energy scores, and QoS-energy scores for other sectors 101-5 through 101-12. As similarly discussed above, such QoS-energy scores may be computed as an average or some other function of QoS scores and/or energy scores. As similarly discussed above, QoS scores and energy scores may be weighted differently in different scenarios, such as when the QoS score and/or the energy score are each above a respective threshold, when a difference between the QoS score and the energy score exceeds a threshold, and/or in other types of scenarios or circumstances. Further, while the examples of FIG. 1B are provided in the context of QoS-energy scores (e.g., the weighting of energy scores based on QoS scores), other types of scores or analyses are possible in practice. For example, as discussed below, weighted energy scores may be generated based on one or more other types of metrics, attributes, characteristics, etc., in addition to or in lieu of QoS metrics associated with particular sectors 101.

Figure 2:
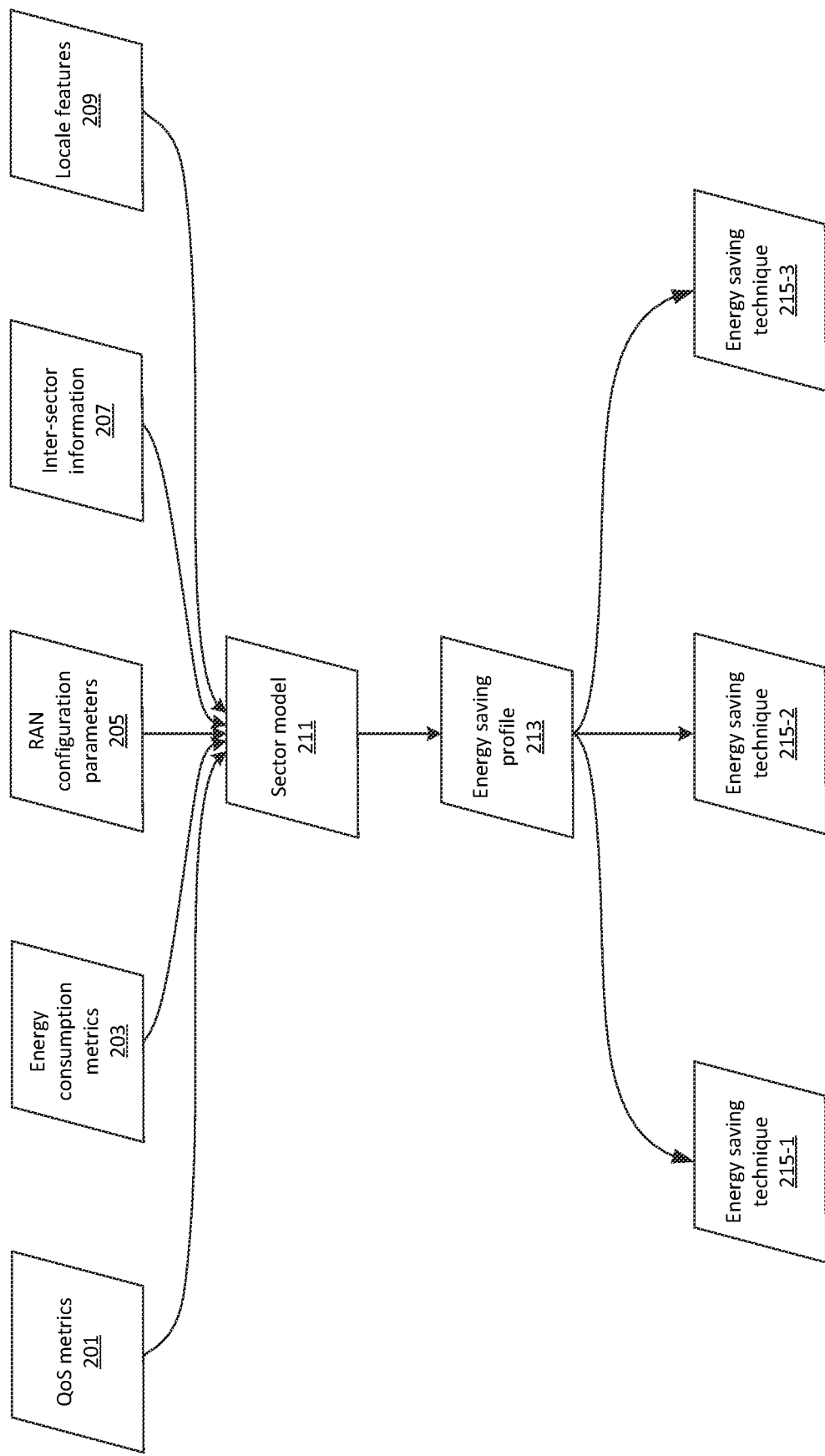
FIG. 2 illustrates an example of using artificial intelligence and/or machine learning ("AI/ML") techniques to determine energy saving techniques that may be applied to particular sectors of one or more RANs based on various factors associated with the sectors, in accordance with some embodiments.

For example, as shown in FIG. 2, QoS metrics 201, energy consumption metrics 203, RAN configuration parameters 205, inter-sector information 207, locale features 209, and/or one or more other types of information may be used (e.g., by Energy Saving System 105) to generate one or more sector models 211. As discussed below, a particular sector model 211 may be associated with one or more energy saving profiles 213, where a given energy saving profile 213 includes a set of energy saving techniques 215, which may be applied a given sector 101 in accordance with embodiments described herein.

For example, as discussed above, QoS metrics 201 may reflect QoS metrics associated with a particular sector 101 over a particular period of time, and energy consumption metrics 203 may indicate an amount of energy consumed at the particular sector 101 over the particular period of time. RAN configuration parameters 205 may include parameters such as an indication of quantity and/or position (e.g., geographical position) of physical infrastructure hardware (e.g., antennas, radios, data centers, or the like) associated with one or more RANs in sector 101. In some embodiments, RAN configuration parameters 205 may indicate particular RATs implemented in sector 101 (e.g., LTE, 5G, etc.), beam configurations implemented in sector 101 (e.g., beam quantity, beam azimuth angles, beam width, beam transmission power, etc.), Multiple-Input Multiple-Output ("MIMO") configuration information, and/or other suitable information.

Inter-sector information 207 may include information associated with sectors adjacent to or proximate to a given sector 101. For example, inter-sector information 207 may include RAN parameters, QoS metrics, and/or energy consumption metrics, associated with sectors adjacent to or within a threshold distance of sector 101. In some embodiments, inter-sector information 207 may include mobility information, which may be associated with mobility of UEs between sector 101 and neighboring sectors. For example, inter-sector information 207 may indicate that UEs that are located in sector 101 are likely to be stationary within sector 101 for a first duration of time (e.g., approximately one hour), and then that such UEs travel to a particular neighboring sector. As another example, inter-sector information 207 may indicate that UEs that are located in the neighboring sector are relatively likely to enter the particular sector 101.

Locale features 209 may include information indicating attributes and/or features of the geographical area. For example, locale features 209 may include information relating to building layout and/or density, topographical features (e.g., mountains, valleys, forests, streams, etc.), weather-related information, air quality-related information (e.g., smog density, particulate density, fog density, etc.), and/or other factors that may affect energy consumption, QoS metrics, or other metrics. Locale features 209 may include geographical coordinates (e.g., latitude and longitude coordinates, Global Positioning System ("GPS") coordinates, or the like) or other suitable location information, to indicate the geographical locations of respective features.

Sector model 211 may be determined based on above-described factors and/or one or more other factors. For example, Energy Saving System 105 may determine that a particular sector 101, that exhibits a particular set of QoS metrics 201, a particular set of energy consumption metrics 203, and a first set of locale features 209 (e.g., urban features such as high-rise buildings) is associated with a first sector model 211, while another sector 101, that exhibits a similar set of QoS metrics 201 and a similar set of energy consumption metrics 203, but a different second set of locale features 209 (e.g., rural features such as relatively flat areas with relatively low building density) is associated with a different second sector model 211. Further examples are provided below. Generally, a given sector model 211 may describe or reflect parameters, metrics, attributes, etc. of a given sector 101.

As further shown, sector model 211 may be associated with one or more energy saving profiles 213. As shown, for example, a given energy saving profile 213 may be associated with one or more energy saving techniques 215 (e.g., energy saving techniques 215-1 through 215-3). Energy savings technique 215-1 may include, for example, one or more time domain RF energy saving techniques. For example, a particular time domain RF energy saving technique may include reducing the amount of time (e.g., time slots) during which base stations or other wireless infrastructure in sector 101 sends and/or receives RF transmissions. For example, such a technique may be selected in situations where particular QoS metrics are relatively high, such as latency, jitter, error rate, and/or throughput. For example, reducing RF transmissions associated with sector 101 may increase latency, jitter, or error rate, but such reduction may not cause QoS metrics to fall below a threshold. In other words, the resulting QoS performance after performing such energy savings techniques may remain at least at an acceptable level.

As another example, energy saving technique 215-2 may include frequency domain RF energy saving techniques. For example, a particular frequency domain RF energy saving technique may include reducing the frequency range of RF transmissions implemented by base stations or other wireless infrastructure in sector 101. For example, such a technique may be selected in situations where a relatively large quantity of frequency bands are implemented by such base stations in sector 101 (e.g., as indicated by RAN configuration parameters 205).

As yet another example, energy saving technique 215-3 may include modifying parameters associated with antennas or beams of base stations located in sector 101. For example, energy saving technique 215-3 may include reducing antenna power, modifying a transmission mode of such antennas, modifying a quantity of transmit paths associated with such antennas, narrowing a beam width of beams implemented by such antennas, and/or modifying other aspects of antennas or beams.

In some embodiments, energy saving techniques 215 may include one or more other energy savings techniques. For example, energy saving techniques 215 may include a cell sleep mode (e.g., where a base station "sleeps" for a certain duration of time, which may include powering down antennas and/or other hardware in order to conserve energy). In some embodiments, energy savings techniques 215 may include provisioning or requesting additional energy resources or facilities, generating an alert or recommendation to install additional energy resources or facilities, and/or other suitable techniques for energy saving. Further, as described herein, the same energy saving technique or methodology with different parameters may sometimes be referred to as different energy saving techniques 215. For example, a first energy saving technique 215 may include a 10% beam power reduction, while a second energy saving technique 215 may include a 30% beam power reduction. As another example, a third energy saving technique 215 may include a 5% reduction in transmitted RF resource blocks ("RBs") in the time and/or frequency domain, while a second energy saving technique 215 may include a 15% reduction in transmitted RF RBs in the time and/or frequency domain.

Figure 3:
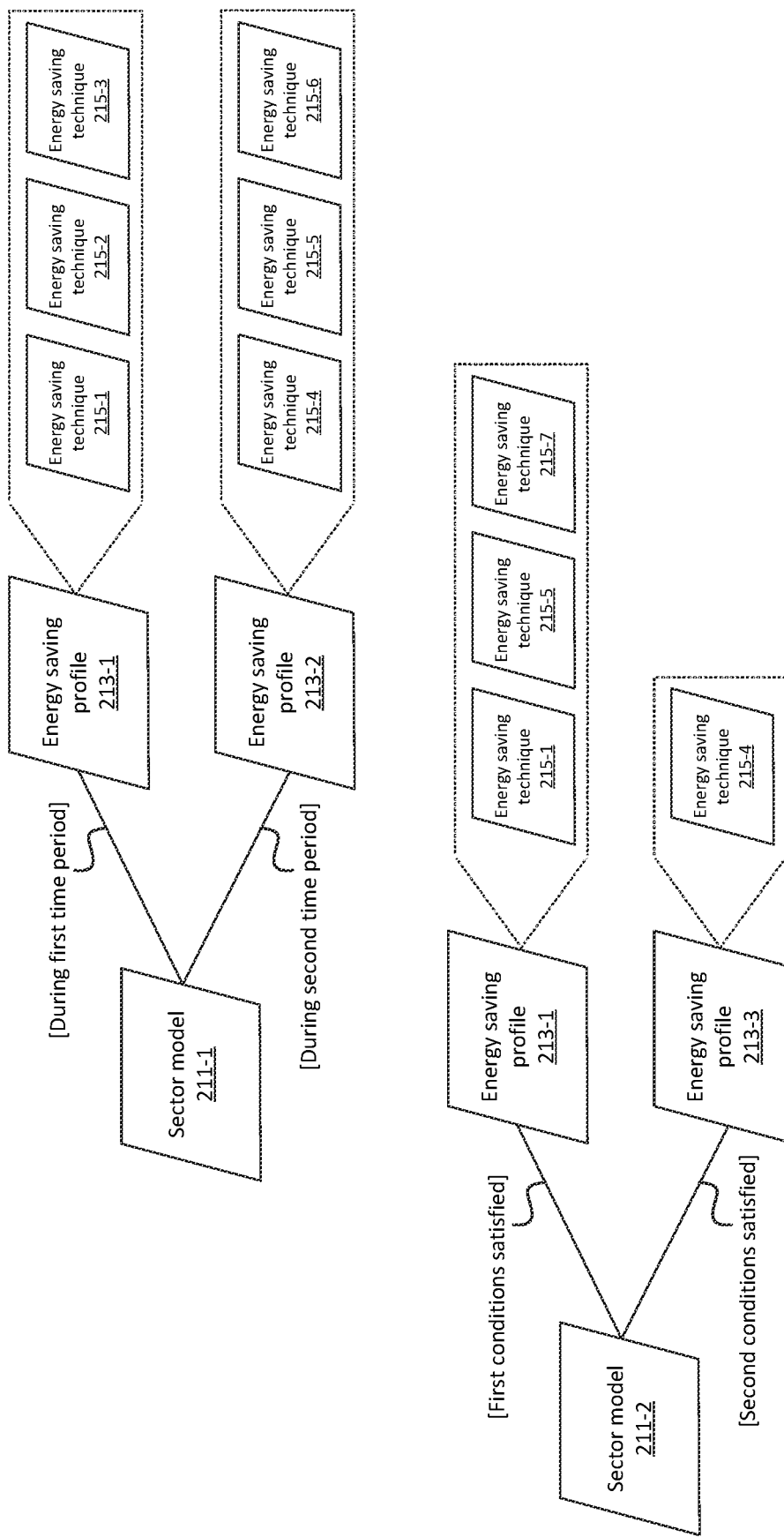
FIG. 3 illustrates an example of different energy savings profiles, associated with different sets of energy saving techniques, that may be applied to different sectors of a RAN under different conditions, in accordance with some embodiments.

As shown in FIG. 3, sector models 211 may be associated with multiple different energy saving profiles 213. For example, sector model 211-1 may be associated with energy saving profile 213-1 and energy saving profile 213-2. Energy Saving System 105 may have identified (e.g., during a "training" phase according to one or more AI/ML or other suitable techniques) that a first set of energy saving techniques (i.e., energy saving techniques 215-1 through 215-3, in this example) should be applied during a first time period (e.g., a first portion of a day, a first day of a week, etc.), while a second set of energy saving techniques (i.e., energy saving techniques 215-4 through 215-6, in this example) should be applied during a second time period (e.g., a second portion of the day, a second day of the week, etc.).

For example, Energy Saving System 105 may have determined (e.g., during a "training" phase, which may include performing simulations and/or collecting data from real-world devices or systems) that a given sector 101 with a particular set of attributes, parameters, etc. (e.g., as discussed above with respect to RAN configuration parameters 205 and/or locale features 209) exhibited a first set of QoS metrics 201 and energy consumption metrics 203 during the first time period, and that sector 101 exhibited a second set of QoS metrics 201 and energy consumption metrics 203 during the second time period. Accordingly, the differing sets of QoS metrics 201 and energy consumption metrics 203 may be factors based on which Energy Saving System 105 identifies the differing sets of energy saving techniques for the different time periods.

As further shown, sector model 211-2 may be associated with different energy saving profiles (i.e., energy saving profile 213-1 and energy saving profile 213-3, in this example) based on the satisfaction of different sets of conditions. For example, sector model 211-2 may be associated with energy saving profile 213-1 (e.g., energy saving techniques 215-1, 215-5, and 215-7) when a first set of conditions are satisfied, and may be associated with energy saving profile 213-3 (e.g., energy saving technique 215-4) when a second set of conditions are satisfied. In some embodiments, the conditions may relate to QoS metrics 201 associated with sector 101, energy consumption metrics 203 associated with sector 101, and/or other conditions. In some embodiments, the conditions may include inter-sector conditions, such as QoS metrics 201, energy consumption metrics 203, and/or other metrics or parameters associated with a neighboring sector 101. In some embodiments, the conditions may relate to energy saving profiles 213 or techniques 215 associated with a neighboring sector 101.

For example, Energy Saving System 105 may determine (e.g., during a "training" phase of one or more AI/ML techniques) that sector model 211-2 should be associated with energy saving profile 213-1 when sector model 211-1 is associated with energy saving profile 213-1, and may determine that sector model 211-2 should be associated with energy saving profile 213-3 when sector model 211-1 is associated with energy saving profile 213-2. As another example, Energy Saving System 105 may determine that sector model 211-2 should be associated with energy saving profile 213-1 when a sector 101 associated with sector model 211-1 exhibits a relatively high amount of energy consumption (which may suggest relative high RF energy or interference from such sector 101), and that sector model 211-2 should be associated with energy saving profile 213-3 when sector 101, associated with sector model 211-1, exhibits a relatively low amount of energy consumption (which may suggest relative low RF energy or interference from sector 101).

In some embodiments, the inter-sector conditions may relate to energy saving techniques 215 applied to neighboring sectors. For example, if a given sector 101 is associated with a particular energy saving technique 215 (e.g., a sector or cell site suspension technique, a modification of RF transmissions from wireless infrastructure in sector 101 in the time and/or frequency domains, etc.), Energy Saving System 105 may determine energy saving techniques 215, energy saving profiles 213, and/or sector models 211 for neighboring sectors based on the energy saving techniques 215 applied to the given sector 101. Additionally, or alternatively, Energy Saving System 105 may determine other parameters to apply to neighboring sectors based on energy saving techniques 215 applied to sector 101. For example, if a cell or sector suspend energy saving technique is applied to sector 101 over a given time period, Energy Saving System 105 may determine that RAN parameters of one or more neighboring sectors should be modified for the given time period. For example, Energy Saving System 105 may determine that a beam configuration associated with the one or more neighboring sectors should be modified, such that a beam directionality, power, width, etc. provided by a base station or other wireless infrastructure is pointed toward cell 101 which has been suspended.

In some embodiments, sectors 101 may be associated with sector models 211 on a conditional basis. For example, a given sector 101 may be associated with sector model 211-1 upon the satisfaction of a first set of conditions, and may be associated with sector model 211-2 (or some other sector model 211) upon the satisfaction of a second set of conditions.

Figure 4:
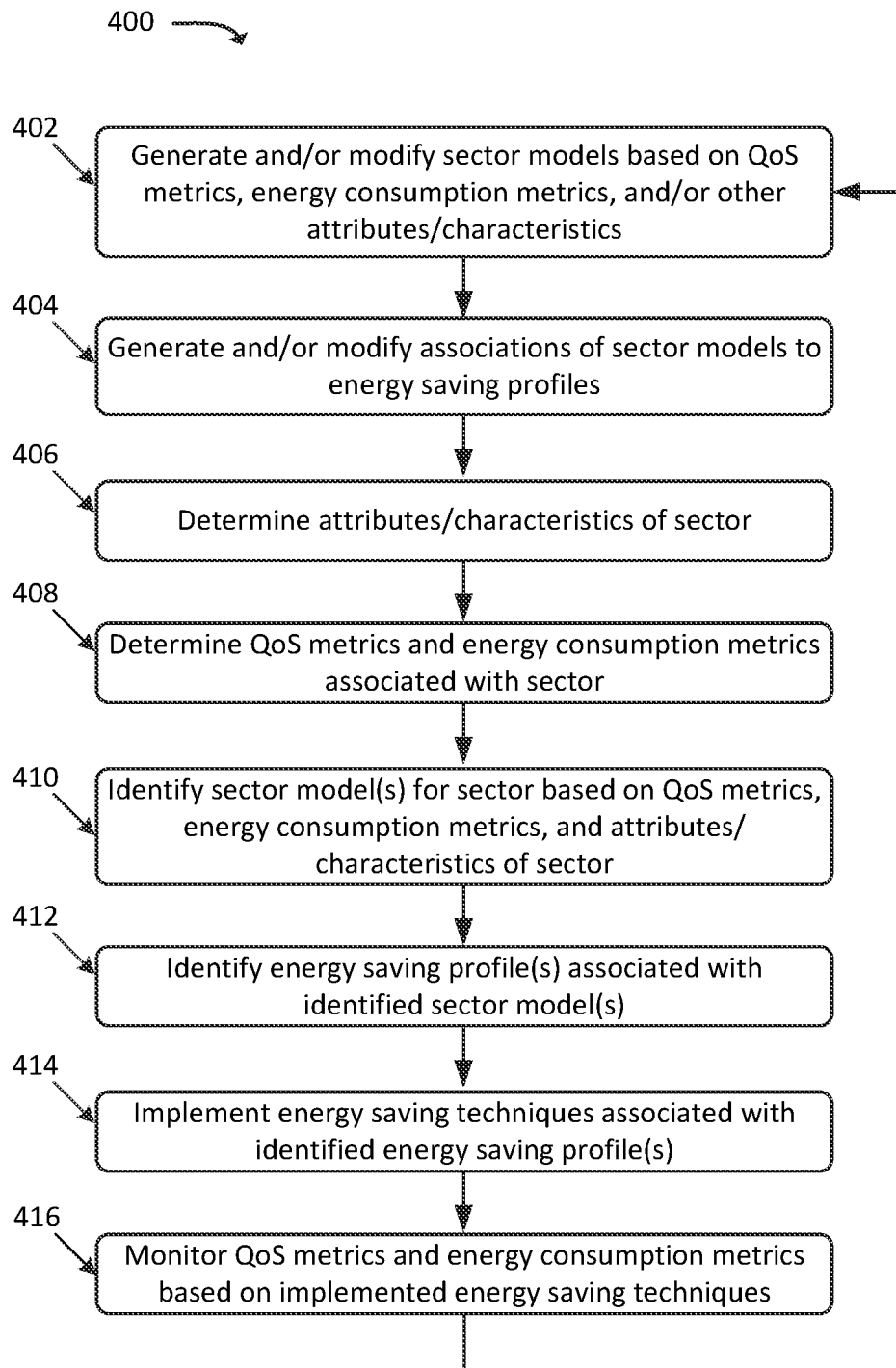
FIG. 4 illustrates an example process for identifying and implementing energy saving techniques for a wireless network based on Quality of Service ("QoS") metrics, energy consumption metrics, and/or other attributes or characteristics of portions of the wireless network, in accordance with some embodiments.

FIG. 4 illustrates an example process 400 for identifying and implementing energy saving techniques for a wireless network based on QoS metrics, energy consumption metrics, and/or other attributes or characteristics of portions of the wireless network. In some embodiments, some or all of process 400 may be performed by Energy Saving System 105. In some embodiments, one or more other devices may perform some or all of process 400 (e.g., in concert with, and/or in lieu of, Energy Saving System 105).

As shown, process 400 may include generating and/or modifying (at 402) sector models based on QoS metrics, energy consumption metrics, attributes and/or characteristics of sectors, and/or other information. For example, as discussed above, Energy Saving System 105 may perform a "training" phase in which Energy Saving System 105 generates and/or modifies sector models associated that exhibit varying sets of QoS and/or energy consumption metrics. As noted above, sector models may be based on other factors, such as RAN configuration parameters, inter-sector information, locale features, and/or other types of factors. For example, Energy Saving System 105 may simulate some or all of the above factors, and/or may receive information regarding real-world usage as such real-world usage pertains to the above factors.

Process 400 may further include generating and/or modifying (at 404) associations of sector models to energy saving profiles. For example, Energy Saving System 105 may (e.g., during a "training" phase) identify a set of energy saving techniques 215 that are associated with a given sector model 211. In some embodiments, Energy Saving System 105 may perform the generating and/or modifying based on data derived from simulations, in which RANs, UEs, and/or other types of devices or systems associated with sectors 101 are simulated. In some embodiments, Energy Saving System 105 may perform the generating and/or modifying based on real-world measurements or metrics from RANs, UEs, and/or other types of devices or systems associated with sectors 101.

For example, Energy Saving System 105 may use AI/ML techniques or other suitable techniques to identify particular energy saving techniques 215 and/or combinations of energy saving techniques 215 that reduce energy consumption for sectors associated with sector model 211. The identification or determining of particular energy saving techniques 215 may further include determining energy saving techniques 215 (or sets of techniques), that result in QoS metrics of such sectors 101 remaining above at least one or more thresholds (e.g., where such thresholds may be associated with QoS experiences that are considered "acceptable").

Process 400 may additionally include determining (at 406) attributes and/or characteristics of sector 101. For example, as similarly discussed above, Energy Saving System 105 may receive or determine a set of locale features 209 associated with sector 101, which may include topographical information, landmark information, weather information, air quality information, and/or other types of information that may have an impact on energy usage and/or QoS metrics. As further discussed above, Energy Saving System 105 may receive or determine RAN configuration parameters 205 associated with one or more RANs, base stations, and/or other wireless infrastructure located within (and/or having a coverage area within) sector 101. As discussed above, Energy Saving System 105 may include parameters such as an indication of quantity and/or position (e.g., geographical position) of physical infrastructure hardware (e.g., antennas, radios, data centers, or the like) associated with one or more RANs in sector 101, beam configurations, RATs implemented in sector 101, and/or other information which may impact energy usage and/or QoS metrics.

Process 400 may further include determining (at 408) QoS metrics and energy consumption metrics associated with sector 101. For example, Energy Saving System 105 may receive or determine information reflecting how much energy has been used by base stations, antennas, radios, data centers, and/or other wireless network infrastructure associated with sector 101 over a given period of time (e.g., one hour, one day, or some other suitable period of time). Energy Saving System 105 may also receive or determine QoS metrics associated with UEs located in sector 101 and/or UEs otherwise receiving wireless service from wireless network infrastructure located in sector 101. In some embodiments, as discussed above, Energy Saving System 105 may also receive power consumption metrics, energy consumption metrics, RAN configuration information, and/or other inter-sector information 207 (e.g., for sectors adjacent to sector 101, sectors not adjacent to sector 101 but within a threshold proximity of sector 101, etc.).

Process 400 may also include identifying (at 410) one or more sector models 211 for sector 101 based on the QoS metrics, energy consumption metrics, and/or the attributes or characteristics of sector 101. For example, Energy Saving System 105 may perform a suitable similarity or correlation analysis based on QoS metrics and/or energy consumption metrics 201 for sector 101 received over time to determine one or more sector models 211 (e.g., as generated and/or modified at 402) that correspond to the QoS metrics and/or energy consumption metrics. In some embodiments, Energy Saving System 105 may further identify the one or more sector models 211 based on attributes and/or characteristics of sector 101 and/or neighboring sectors (e.g., RAN configuration parameters 205, inter-sector information 207, locale features 209, and/or other information). As noted above, sector 101 may be associated with multiple models. In some embodiments, the multiple models may each be associated with different respective sets of conditions, which may be based on time of day, quantity of UEs located in sector 101, and/or other conditions.

Process 400 may further include identifying (at 412) one or more energy saving profiles 213 associated with the identified sector model(s) 211. For example, as discussed above, Energy Saving System 105 may have generated and/or modified (at 404) associations of energy saving profiles 213 to sector models 211. Energy Saving System 105 may accordingly determine, for sector 101, which of the energy saving profiles 213 (and/or which particular energy saving techniques 215) should be applied based on the sector model(s) determined (at 410) for sector 101.

In some situations, the energy saving profiles 213 and/or techniques 215 may be selected in order for energy consumption for sector 101 to be reduced, as compared to a previous level of energy consumption (e.g., in situations where QoS metrics for sector 101 previously exceeded a threshold level of QoS metrics). In some situations, the energy saving profiles 213 and/or techniques 215 may be selected in order for energy consumption for sector 101 to be increased, as compared to a previous level of energy consumption (e.g., in situations where QoS metrics for sector 101 previously did not exceed a threshold level of QoS metrics, and where increasing energy consumption may lead to QoS metrics meeting or exceeding the threshold level).

Process 400 may additionally include implementing (at 414) the respective energy saving techniques 215 associated with the identified energy saving profiles 213. For example, Energy Saving System 105 may communicate (e.g., via an API or other suitable communication pathway) with base stations and/or other wireless network infrastructure located in sector 101, to cause such base stations or other wireless network infrastructure to implement the determined energy saving techniques 215. In turn, such base stations or other wireless network infrastructure may implement the energy saving techniques 215 (e.g., modified amounts of transmissions on the time and/or frequency domains, modified antenna modes, modified beamforming characteristics, cell suspend techniques, and/or other suitable techniques).

Process 400 may include continuing to monitor (at 416) QoS metrics and/or energy consumption metrics at sector 101, based on implementing the determined energy saving techniques 215. For example, as similarly discussed above with respect to block 408, Energy Saving System 105 may monitor QoS metrics and/or energy consumption metrics at sector 101 after energy saving techniques 215 have been implemented. Energy Saving System 105 may accordingly be able to determine whether energy consumption has been reduced at sector 101, and/or whether QoS metrics associated with sector 101 meet or exceed threshold values.

Based on the monitoring, Energy Saving System 105 may use AI/ML or other suitable techniques to modify (at 402) one or more sector models 211 associated with sector 101, and/or to modify (at 404) associations between sector models 211 and energy saving profiles 213. For example, if the implemented energy saving techniques 215 reduced energy consumption at sector 101 and the resulting QoS metrics exceeded one or more threshold levels, Energy Saving System 105 may strengthen an association, affinity, score, etc. that associates metrics and/or attributes associated with sector 101 to sector model 211, energy saving profile 213, and/or energy saving techniques 215. If, on the other hand, the implemented energy saving techniques 215 did not reduce energy consumption at sector 101 and/or the resulting QoS metrics did not exceed threshold levels, Energy Saving System 105 may reduce or weaken an association, affinity, score, etc. that associates metrics and/or attributes associated with sector 101 to sector model 211, energy saving profile 213, and/or energy saving techniques 215. In this manner, Energy Saving System 105 may continually determine appropriate energy saving techniques 215 to apply to wireless network infrastructure in different sectors 101, based on QoS metrics, energy consumption metrics, RAN configuration parameters, inter-sector information, and/or locale features associated with respective sectors 101.

Further, in some embodiments, some or all of process 400 may be performed in a recursive manner. For example, the generation (at 402) of sector models, generation (at 404) of associations of sector models to energy saving profiles, determination (at 406) of attributes and/or characteristics of sectors, determination (at 408) of QoS metrics and/or energy consumption metrics, identification (at 410) of sector models, and/or other operations may be performed for a sector based on similar operations (or other operations) having been performed on portions of the sector. For example, a sector may include a set of sub-sectors (or other suitable portions, such as clusters, cells, etc.) that are identified (at 410) as being "high energy use" or "high mobility" sub-sectors (e.g., based on energy consumption metrics determined (at 408) for the sub-sectors and/or other suitable information associated with the sub-sectors). Energy Saving System 105 may determine (at 410) that the sector is a "high energy use" or "high mobility" sector based on the "high energy use" or "high mobility" classification of the sub-sectors. Similarly, sectors may be clustered or classified together, such that a super sector or other type of geographical area may be classified based on the classifications of multiple sectors.

Figure 5:
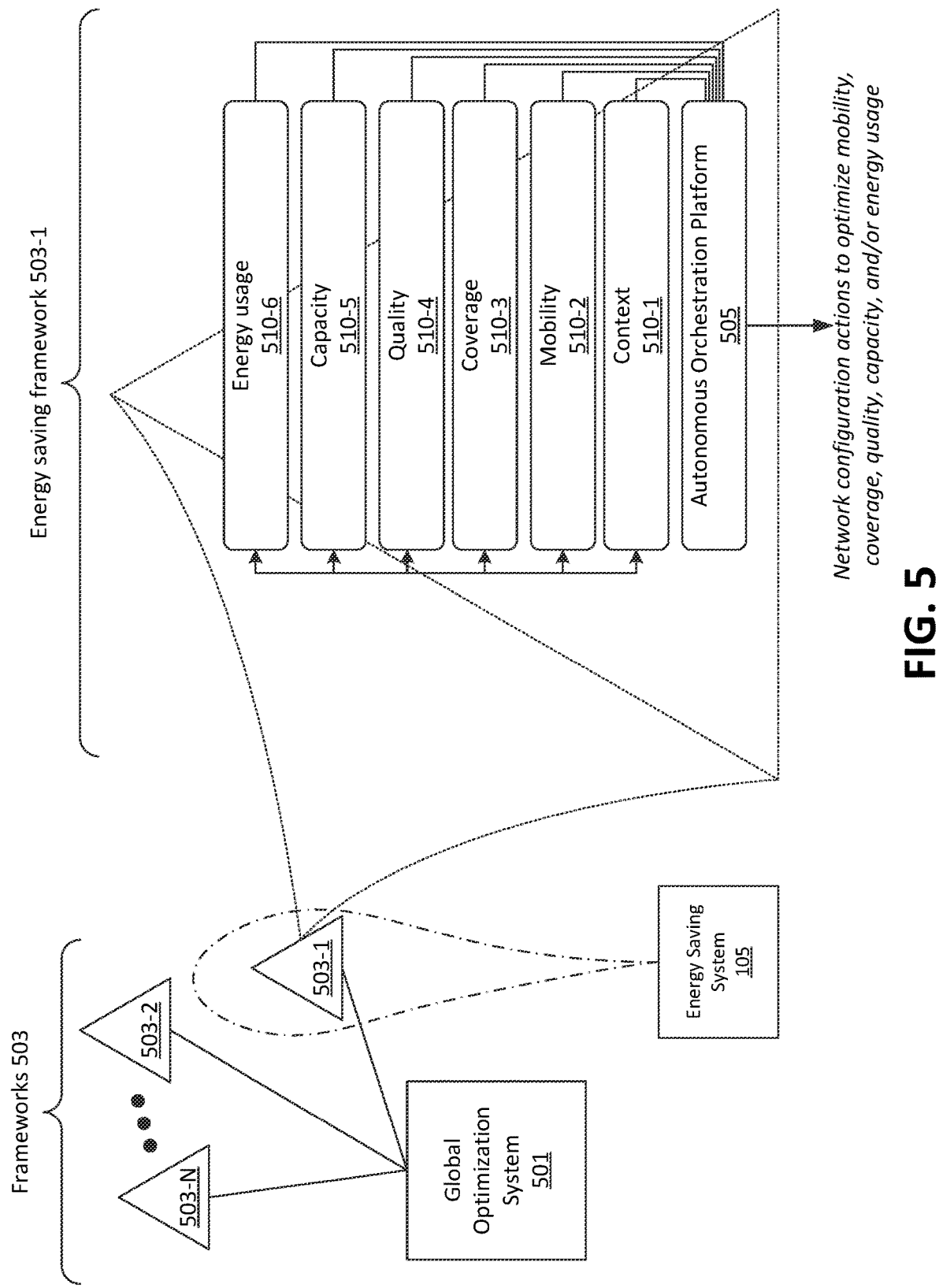
FIG. 5 illustrates an example of an energy saving framework, out of a set of available frameworks, provided by a Global Optimization System of some embodiments.

The description provided above may be an example embodiment of an implementation of a framework provided by a Global Optimization System of some embodiments. For example, as shown in FIG. 5, Global Optimization System 501 may maintain one or more frameworks 503, which may be associated with different key performance indicators ("KPIs"), which may include network performance and/or load metrics. The KPIs may be monitored from one or more base stations and/or sectors 101 (e.g., as discussed above), and actions may be determined and/or performed by a suitable action platform, such as Autonomous Orchestration Platform 505. For example, as discussed above, Autonomous Orchestration Platform 505 may perform actions related to one or more the KPIs. Frameworks 503 may be associated with other types of information, criteria, contexts, or the like in addition to, or in lieu of, KPIs. Although FIG. 5 illustrates three example frameworks 503-1, 503-2, and 503-N, in practice, Global Optimization System 501 of some embodiments may include hundreds, thousands, millions, or more frameworks 503. Different frameworks 503 may have different objectives, goals, criteria, actions, etc.

Frameworks 503 may be provided to, or accessed by, one or more suitable devices or systems, which may use frameworks 503 to analyze KPIs and/or other factors in order to perform operations related to optimizing a network or other suitable actions based on the respective KPIs and/or other factors. For example, energy saving framework 503-1 may be an energy saving framework used by Energy Saving System 105 in a manner described above.

As shown, energy saving framework 503-1 may be associated with Autonomous Orchestration Platform 505, which may be a device, system, platform, application server, self-organizing network orchestrator, cloud computing architecture, virtualized architecture or system, etc. Autonomous Orchestration Platform 505 may implement one or more APIs or other suitable communication pathways to authenticate Energy Saving System 105 and/or Autonomous Orchestration Platform 505, and to instruct, request, cause, etc. one or more network elements (e.g., base stations, antennas, radio units, and/or other types of network infrastructure) to perform one or more configuration changes or other actions based on analyses of KPIs or other suitable types of information.

Such KPIs and/or other information associated with energy saving framework 503-1 may include, for example, context 510-1, mobility 510-2, coverage 510-3, quality 510-4, capacity 510-5, and energy usage 510-6. In practice, the KPIs and/or other information associated with energy saving framework 503-1 may include other KPIs or other information, may include different KPIs or other information, and/or may include differently arranged KPIs or other information than the example shown in FIG. 5.

Context 510-1 may include, for example, characteristics relating to UEs connected to or otherwise associated with RANs in particular sectors 101. Such characteristics may relate to individual UEs, such as whether a respective UE is indoors, outdoors, in wireless range of other UEs (e.g., sometimes referred to as "device to device" or "D2D" information), and/or other UE-specific information. In some embodiments, such characteristics may refer to aggregated data regarding multiple UEs, and/or inter-UE data. For example, context 510-1 may include density information, indicating a quantity of UEs located in a given sector 101 at a given time or time window. In some embodiments, context 510-1 may include KPIs, metrics, etc. relating to quantity of connections and/or disconnections at a given base station or RAN in a geographical area (e.g., sector 101), quantity of sessions (e.g., successful or active sessions, failed sessions, etc.) at a given RAN or geographical area, quantity of sessions classified as "mobile" sessions, quantity of sessions classified as "stationary" sessions, quantity of originated and/or terminated calls, quantity of sessions according to a particular QoS level (e.g., QoS Class Identifier ("QCI")), quantity of Voice over IP ("VoIP") sessions, quantity of Voice over LTE ("VoLTE") sessions, quantity of Voice over New Radio ("VoNR") sessions, total Radio Resource Control ("RRC") duration, and/or other types of KPIs, metrics, or the like.

Mobility 510-2 may include information relating to UE mobility. Such information may include, for example, whether a given UE is moving within sector 101, moving between sectors, and/or is stationary. Mobility 510-2 may further include trends, weights, constraints, predictions, etc. relating to mobility, such as whether a given UE is likely to enter, exit, traverse within, and/or remain stationary within sector 101. For example, such trends, weights, predictions, etc. may be generated, derived, calculated, computed, etc. based on one or more AI/ML techniques or other suitable techniques. Such techniques may include deep learning, reinforced or unreinforced machine learning, neural networks, K-means clustering, regression analysis, and/or other suitable techniques, analyses, computations, or the like. In some embodiments, mobility 510-2 may include KPIs, metrics, values, etc. relating to a quantity of inter-RAT handovers occurring in a particular geographical area (e.g., sector 101) or with respect to a respective base station over a given time period, quantity of inter-cell type sessions over a given time period, quantity of co-sector transitions over a given time period, quantity of intra-frequency handovers over a given time period, quantity of inter-frequency handovers over a given time period, quantity of blind redirections over a given time period, and/or other suitable KPIs, metrics, and/or other information.

Coverage 510-3 may include KPIs, metrics, parameters, etc. relating to RAN coverage within a given geographical area and/or sector 101. For example, coverage 510-3 may relate to areas within sector 101 that receive wireless coverage from base stations or other wireless network infrastructure located within or otherwise serving sector 101. In some embodiments, coverage 510-3 may be inter-related with quality 510-4, in that KPIs, metrics, etc. relating to signal quality may vary as a function of location (e.g., different levels or qualities of coverage may be available at different locations within sector 101). Such KPIs, metrics, etc. may include a Reference Signal Receive Power ("RSRP") value (e.g., a mean RSRP value over a given time period, a maximum RSRP value over a given time period, a minimum RSRP value over a given time period, etc.), a Reference Signal Received Quality ("RSRQ") (e.g., a mean RSRQ value over a given time period, a maximum RSRQ value over a given time period, a minimum RSRQ value over a given time period, etc.), a Channel Quality Indicator ("CQI") value (e.g., a mean CQI value over a given time period, a maximum CQI value over a given time period, a minimum CQI value over a given time period, etc.), an uplink ("UL") power headroom value (e.g., a mean UL power headroom value over a given time period, a maximum UL power headroom value over a given time period, a minimum UL power headroom value over a given time period, etc.), an UL Physical Uplink Shared Channel ("PUSCH") Signal-to-Interference-and-Noise-Ratio ("SINR") value (e.g., a mean UL PUSCH value over a given time period, a maximum UL PUSCH value over a given time period, a minimum UL PUSCH value over a given time period, etc.), a UL Physical Uplink Control Channel ("PUCCH") value (e.g., a mean UL PUCCH value over a given time period, a maximum UL PUCCH value over a given time period, a minimum UL PUCCH value over a given time period, etc.), quantity or percentage of samples with a given transmission ("Tx") mode, MIMO utilization values, and/or other suitable KPIs, values, metrics, or the like. As noted above, such KPIs, values, metrics, or the like may be monitored, provided, etc. in a location-based manner (e.g., coverage 510-3 and quality 510-4 may be inter-related).

While coverage 510-3 and quality 510-4 are described above as being inter-related, in practice, some or all of the KPIs, metrics, etc. associated with energy saving framework 503-1 may be inter-related in a similar manner. For example, context 510-1, mobility 510-2, coverage 510-3, quality 510-4, capacity 510-5, energy usage 510-6, and/or other KPIs, metrics, etc. may be inter-related and/or inter-dependent, such that energy saving framework 503-1 provides a flexible and dynamic optimization framework based on some or all of these KPIs, metrics, etc.

Continuing with the example of FIG. 5, capacity 510-5 may include KPIs, metrics, etc. relating to capacity at a given sector 101, base station, etc. For example, capacity 510-5 may include a total carrier aggregation ("CA") duration over a given time period, a total downlink ("DL") data volume over a given time period, a total UL data volume over a given time period, a DL throughput mean value, a UL throughput mean value, and/or some other suitable KPI, metric, value, etc.

Energy usage 510-6 may include as, mentioned above, KPIs, metrics, and/or other suitable information describing energy usage or consumption at one or more base stations, sectors 101, etc. For example, energy usage 510-6 may include the quantity of watt-hours, kilowatt-hours, etc. of energy consumed over a given time period. In some embodiments, energy usage 510-6 may describe instantaneous rates of energy consumption (e.g., watts, kilowatts, etc.) at a given point in time.

Some or all of the KPIs, metrics, values, characteristics, etc. associated with context 510-1, mobility 510-2, coverage 510-3, quality 510-4, capacity 510-5, energy usage 510-6, etc. may be evaluated by Energy Saving System 105 or some other suitable device or system. In some embodiments, such KPIs, metrics, values, characteristics, etc. may be fed to Autonomous Orchestration Platform 505, such that Autonomous Orchestration Platform 505 may perform one or more actions relating to the optimization of one or more of mobility 510-2, coverage 510-3, quality 510-4, capacity 510-5, and/or energy usage 510-6. In some embodiments, Autonomous Orchestration Platform 505 may perform actions in a hierarchical or sequential manner, such as by satisfying criteria associated with the optimization mobility 510-2 before attempting to optimize parameters associated with coverage 510-3. In some embodiments, Autonomous Orchestration Platform 505 may perform a weighting function or some other suitable function in order to optimize some or all of mobility 510-2, coverage 510-3, quality 510-4, capacity 510-5, and/or energy usage 510-6, where such optimization may be weighted compromise of considerations associated with mobility 510-2, coverage 510-3, quality 510-4, capacity 510-5, and energy usage 510-6 (e.g., where considerations relating to mobility 510-2 may be more heavily weighted than considerations related to coverage 510-3, where considerations relating to coverage 510-3 may be more heavily weighted than considerations related to quality 510-4, or the like).

Figure 6:
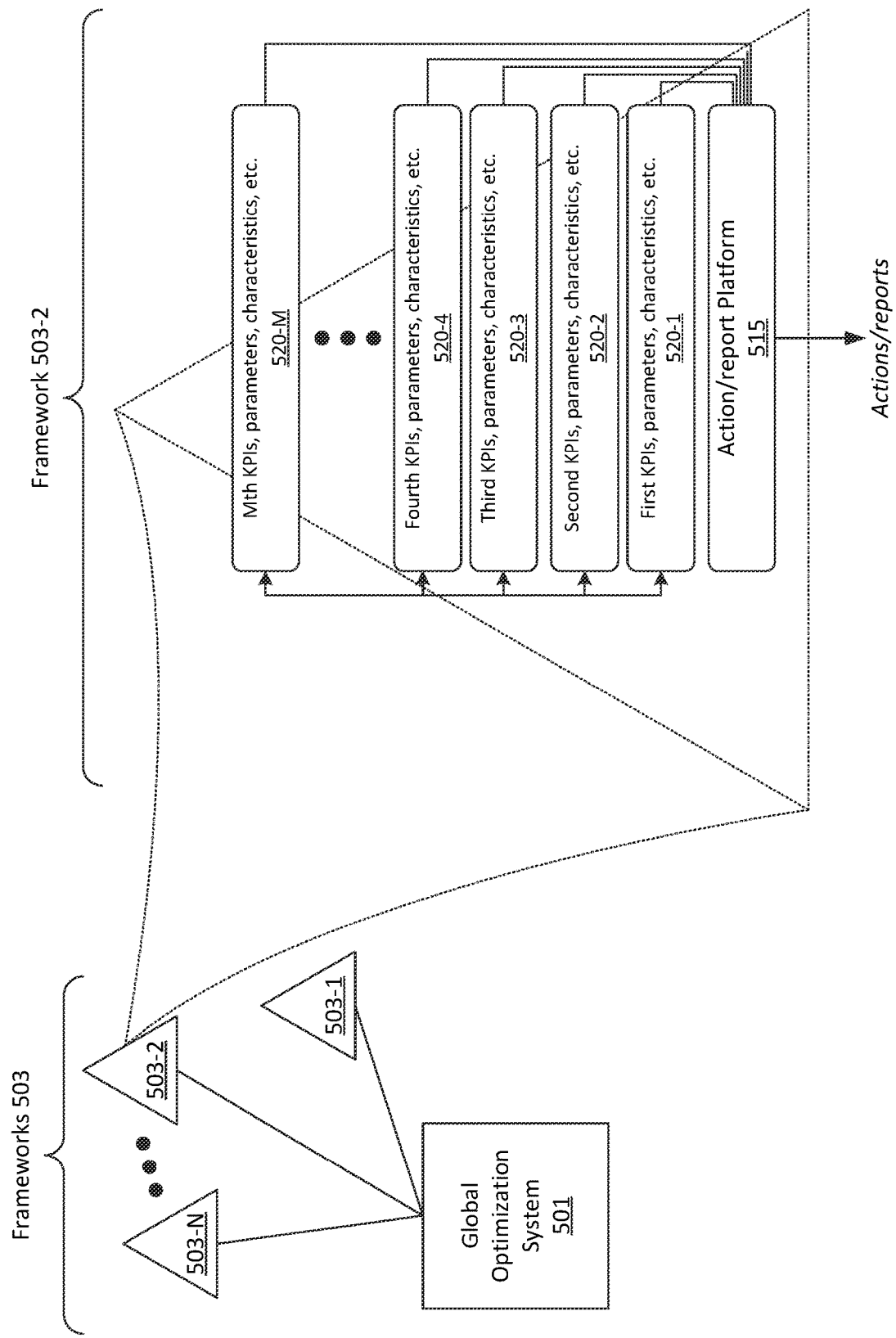
FIG. 6 illustrates an example of another example framework, out of the set of available frameworks, provided by the Global Optimization System of some embodiments.

FIG. 6 illustrates another example of another framework 503 that may be maintained, provided, etc. by Global Optimization System 501. For example, as shown, framework 503-2 may be associated with a suitable action and/or report platform 515, which may perform actions, generate reports, or the like based on KPIs, parameters, characteristics, etc. 520 (e.g., KPIs, parameters, characteristics, etc. 520-1 through 520-M). KPIs, parameters, characteristics, etc. 520 may include any suitable type of KPIs, parameters, characteristics, etc. 520 relating to actions to be performed in a network environment, in order to optimize considerations relating to KPIs, parameters, characteristics, etc. 520 in a manner similar to that described above.

Figure 7:
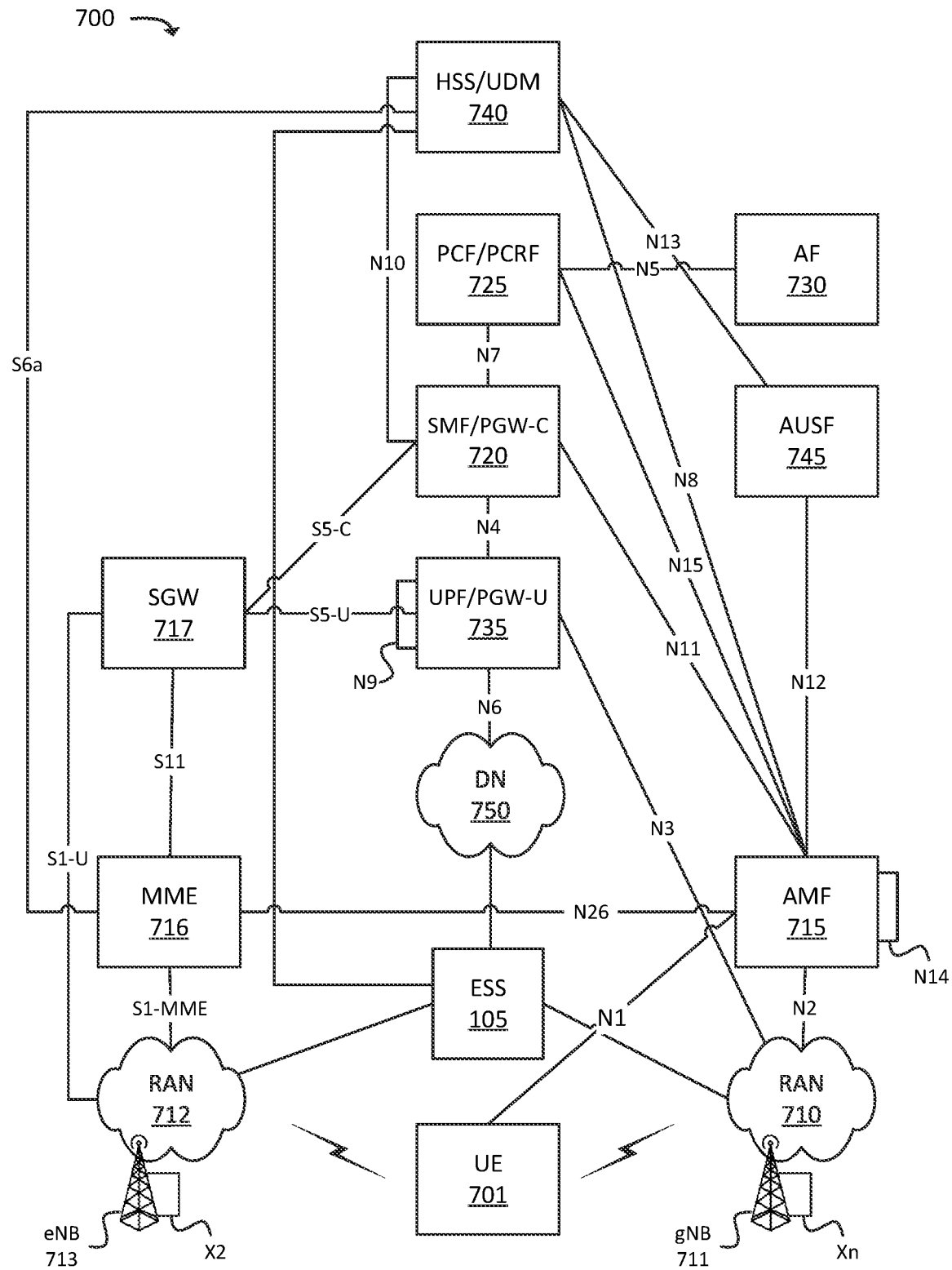
FIG. 7 illustrates an example environment in which one or more embodiments, described herein, may be implemented.

FIG. 7 illustrates an example environment 700, in which one or more embodiments may be implemented. In some embodiments, environment 700 may correspond to a 5G network, and/or may include elements of a 5G network. In some embodiments, environment 700 may correspond to a 5G Non-Standalone ("NSA") architecture, in which a 5G RAT may be used in conjunction with one or more other RATs (e.g., a LTE RAT), and/or in which elements of a 5G core network may be implemented by, may be communicatively coupled with, and/or may include elements of another type of core network (e.g., an evolved packet core ("EPC")). As shown, environment 700 may include UE 701, RAN 710 (which may include one or more Next Generation Node Bs ("gNBs") 711), RAN 712 (which may include one or more one or more evolved Node Bs ("eNBs") 713), and various network functions such as Access and Mobility Management Function ("AMF") 715, Mobility Management Entity ("MIME") 716, Serving Gateway ("SGW") 717, Session Management Function ("SMF")/Packet Data Network ("PDN") Gateway ("PGW")-Control plane function ("PGW-C") 720, Policy Control Function ("PCF")/Policy Charging and Rules Function ("PCRF") 725, Application Function ("AF") 730, User Plane Function ("UPF")/PGW-User plane function ("PGW-U") 735, Home Subscriber Server ("HSS")/Unified Data Management ("UDM") 740, Authentication Server Function ("AUSF") 745, and Energy Saving System 105. Environment 700 may also include one or more networks, such as Data Network ("DN") 750.

The example shown in FIG. 7 illustrates one instance of each network component or function (e.g., one instance of SMF/PGW-C 720, PCF/PCRF 725, UPF/PGW-U 735, HSS/UDM 740, and/or 745). In practice, environment 700 may include multiple instances of such components or functions. For example, in some embodiments, environment 700 may include multiple "slices" of a core network, where each slice includes a discrete set of network functions (e.g., one slice may include a first instance of SMF/PGW-C 720, PCF/PCRF 725, UPF/PGW-U 735, HSS/UDM 740, and/or 745, while another slice may include a second instance of SMF/PGW-C 720, PCF/PCRF 725, UPF/PGW-U 735, HSS/UDM 740, and/or 745). The different slices may provide differentiated levels of service, such as service in accordance with different Quality of Service ("QoS") parameters.

The quantity of devices and/or networks, illustrated in FIG. 7, is provided for explanatory purposes only. In practice, environment 700 may include additional devices and/or networks, fewer devices and/or networks, different devices and/or networks, or differently arranged devices and/or networks than illustrated in FIG. 7. For example, while not shown, environment 700 may include devices that facilitate or enable communication between various components shown in environment 700, such as routers, modems, gateways, switches, hubs, etc. Alternatively, or additionally, one or more of the devices of environment 700 may perform one or more network functions described as being performed by another one or more of the devices of environment 700. Devices of environment 700 may interconnect with each other and/or other devices via wired connections, wireless connections, or a combination of wired and wireless connections. In some implementations, one or more devices of environment 700 may be physically integrated in, and/or may be physically attached to, one or more other devices of environment 700.

UE 701 may include a computation and communication device, such as a wireless mobile communication device that is capable of communicating with RAN 710, RAN 712, and/or DN 750. UE 701 may be, or may include, a radiotelephone, a personal communications system ("PCS") terminal (e.g., a device that combines a cellular radiotelephone with data processing and data communications capabilities), a personal digital assistant ("PDA") (e.g., a device that may include a radiotelephone, a pager, Internet/intranet access, etc.), a smart phone, a laptop computer, a tablet computer, a camera, a personal gaming system, an IoT device (e.g., a sensor, a smart home appliance, or the like), a wearable device, an Internet of Things ("IoT") device, a Mobile-to-Mobile ("M2M") device, or another type of mobile computation and communication device. UE 701 may send traffic to and/or receive traffic (e.g., user plane traffic) from DN 750 via RAN 710, RAN 712, and/or UPF/PGW-U 735.

RAN 710 may be, or may include, a 5G RAN that includes one or more base stations (e.g., one or more gNBs 711), via which UE 701 may communicate with one or more other elements of environment 700. UE 701 may communicate with RAN 710 via an air interface (e.g., as provided by gNB 711). For instance, RAN 710 may receive traffic (e.g., voice call traffic, data traffic, messaging traffic, signaling traffic, etc.) from UE 701 via the air interface, and may communicate the traffic to UPF/PGW-U 735, and/or one or more other devices or networks. Similarly, RAN 710 may receive traffic intended for UE 701 (e.g., from UPF/PGW-U 735, AMF 715, and/or one or more other devices or networks) and may communicate the traffic to UE 701 via the air interface. In some embodiments, gNB 711 may be, may include, and/or may be implemented by base station 103.

RAN 712 may be, or may include, a LTE RAN that includes one or more base stations (e.g., one or more eNBs 713), via which UE 701 may communicate with one or more other elements of environment 700. UE 701 may communicate with RAN 712 via an air interface (e.g., as provided by eNB 713). For instance, RAN 710 may receive traffic (e.g., voice call traffic, data traffic, messaging traffic, signaling traffic, etc.) from UE 701 via the air interface, and may communicate the traffic to UPF/PGW-U 735, and/or one or more other devices or networks. Similarly, RAN 710 may receive traffic intended for UE 701 (e.g., from UPF/PGW-U 735, SGW 717, and/or one or more other devices or networks) and may communicate the traffic to UE 701 via the air interface. In some embodiments, eNB 713 may be, may include, and/or may be implemented by base station 103.

AMF 715 may include one or more devices, systems, Virtualized Network Functions ("VNFs"), etc., that perform operations to register UE 701 with the 5G network, to establish bearer channels associated with a session with UE 701, to hand off UE 701 from the 5G network to another network, to hand off UE 701 from the other network to the 5G network, manage mobility of UE 701 between RANs 710 and/or gNBs 711, and/or to perform other operations. In some embodiments, the 5G network may include multiple AMFs 715, which communicate with each other via the N14 interface (denoted in FIG. 7 by the line marked "N14" originating and terminating at AMF 715).

MME 716 may include one or more devices, systems, VNFs, etc., that perform operations to register UE 701 with the EPC, to establish bearer channels associated with a session with UE 701, to hand off UE 701 from the EPC to another network, to hand off UE 701 from another network to the EPC, manage mobility of UE 701 between RANs 712 and/or eNBs 713, and/or to perform other operations.

SGW 717 may include one or more devices, systems, VNFs, etc., that aggregate traffic received from one or more eNBs 713 and send the aggregated traffic to an external network or device via UPF/PGW-U 735. Additionally, SGW 717 may aggregate traffic received from one or more UPF/PGW-Us 735 and may send the aggregated traffic to one or more eNBs 713. SGW 717 may operate as an anchor for the user plane during inter-eNB handovers and as an anchor for mobility between different telecommunication networks or RANs (e.g., RANs 710 and 712).

SMF/PGW-C 720 may include one or more devices, systems, VNFs, etc., that gather, process, store, and/or provide information in a manner described herein. SMF/PGW-C 720 may, for example, facilitate in the establishment of communication sessions on behalf of UE 701. In some embodiments, the establishment of communications sessions may be performed in accordance with one or more policies provided by PCF/PCRF 725.

PCF/PCRF 725 may include one or more devices, systems, VNFs, etc., that aggregate information to and from the 5G network and/or other sources. PCF/PCRF 725 may receive information regarding policies and/or subscriptions from one or more sources, such as subscriber databases and/or from one or more users (such as, for example, an administrator associated with PCF/PCRF 725).

AF 730 may include one or more devices, systems, VNFs, etc., that receive, store, and/or provide information that may be used in determining parameters (e.g., quality of service parameters, charging parameters, or the like) for certain applications.

UPF/PGW-U 735 may include one or more devices, systems, VNFs, etc., that receive, store, and/or provide data (e.g., user plane data). For example, UPF/PGW-U 735 may receive user plane data (e.g., voice call traffic, data traffic, etc.), destined for UE 701, from DN 750, and may forward the user plane data toward UE 701 (e.g., via RAN 710, SMF/PGW-C 720, and/or one or more other devices). In some embodiments, multiple UPFs 735 may be deployed (e.g., in different geographical locations), and the delivery of content to UE 701 may be coordinated via the N9 interface (e.g., as denoted in FIG. 5 by the line marked "N9" originating and terminating at UPF/PGW-U 735). Similarly, UPF/PGW-U 735 may receive traffic from UE 701 (e.g., via RAN 710, SMF/PGW-C 720, and/or one or more other devices), and may forward the traffic toward DN 750. In some embodiments, UPF/PGW-U 735 may communicate (e.g., via the N4 interface) with SMF/PGW-C 720, regarding user plane data processed by UPF/PGW-U 735.

HSS/UDM 740 and AUSF 745 may include one or more devices, systems, VNFs, etc., that manage, update, and/or store, in one or more memory devices associated with AUSF 745 and/or HSS/UDM 740, profile information associated with a subscriber. AUSF 745 and/or HSS/UDM 740 may perform authentication, authorization, and/or accounting operations associated with the subscriber and/or a communication session with UE 701.

Energy Saving System 105 may include one or more devices, systems, VNFs, etc., that perform one or more operations described above. For example, Energy Saving System 105 may communicate with RAN 710, RAN 712, DN 750, or some other network. In some embodiments, Energy Saving System 105 may be implemented via a cloud computing system or some other suitable device or collection of devices. As discussed above, Energy Saving System 105 may determine QoS metrics and/or energy consumption metrics (and/or other suitable information) at various sectors associated with RAN 710, RAN 712, and/or one or more other RANs or wireless networks, in order to modify network parameters (e.g., parameters that may modify energy consumption) associated with RAN 710, RAN 712, and/or one or more other RANs or wireless networks. Energy Saving System 105 may further cause RAN 710, RAN 712, and/or one or more other RANs or wireless networks to implement (or cease implementing) various energy saving techniques, in order to balance QoS metrics and energy consumption metrics. In some embodiments, Energy Saving System 105 may communicate with HSS/UDM 740 and/or one or more other network elements, in order to identify or authenticate Energy Saving System 105 and/or perform other suitable functions. In some embodiments, Energy Saving System 105 may be, may include, may be implemented by, may be communicatively coupled with, and/or may other wise be associated with Global Optimization System 701.

DN 750 may include one or more wired and/or wireless networks. For example, DN 750 may include an Internet Protocol ("IP")-based PDN, a wide area network ("WAN") such as the Internet, a private enterprise network, and/or one or more other networks. UE 701 may communicate, through DN 750, with data servers, other UEs 701, and/or to other servers or applications that are coupled to DN 750. DN 750 may be connected to one or more other networks, such as a public switched telephone network ("PSTN"), a public land mobile network ("PLMN"), and/or another network. DN 750 may be connected to one or more devices, such as content providers, applications, web servers, and/or other devices, with which UE 701 may communicate.

Figure 8:
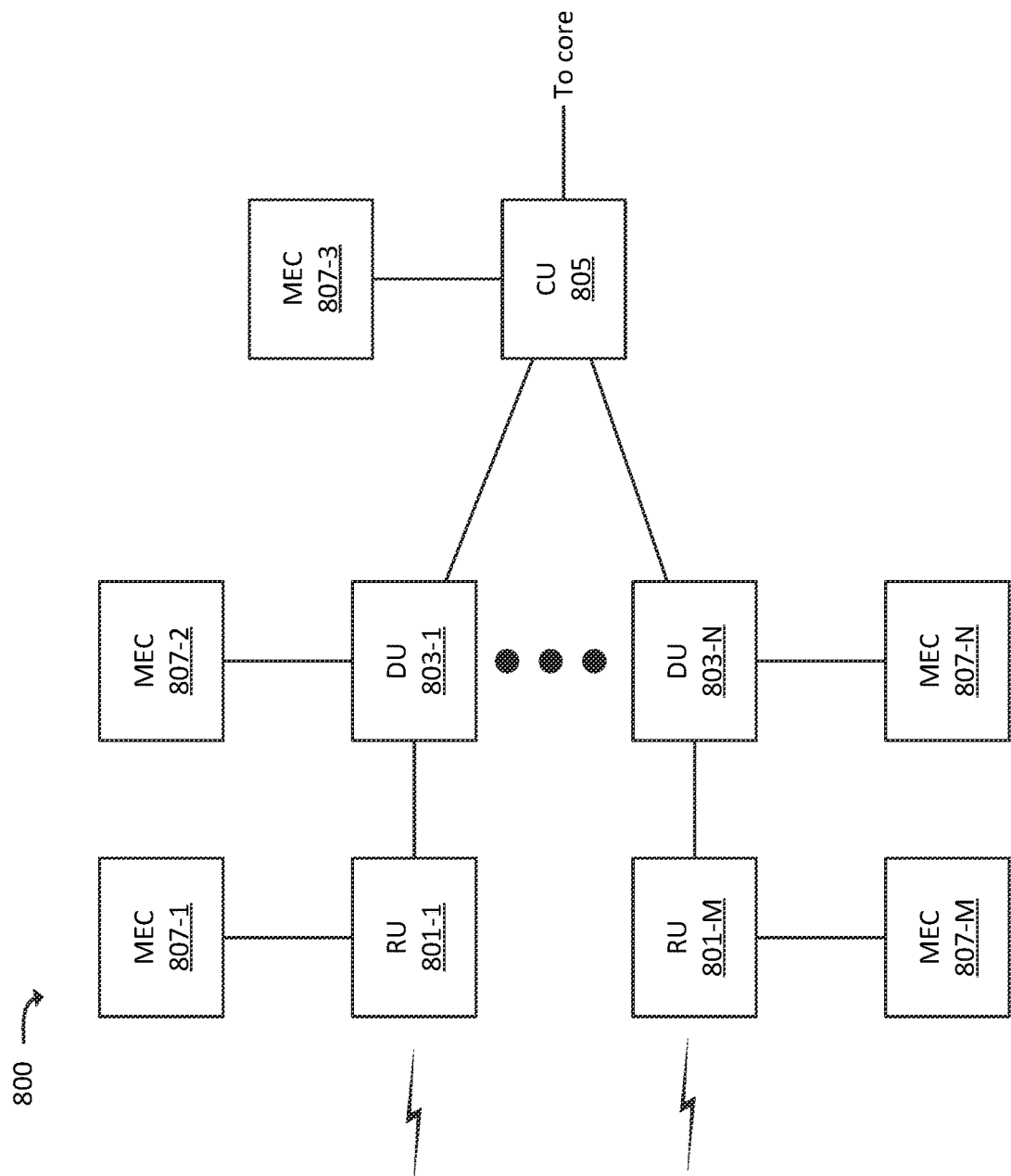
FIG. 8 illustrates an example arrangement of a radio access network ("RAN"), in accordance with some embodiments.
Figure 9:
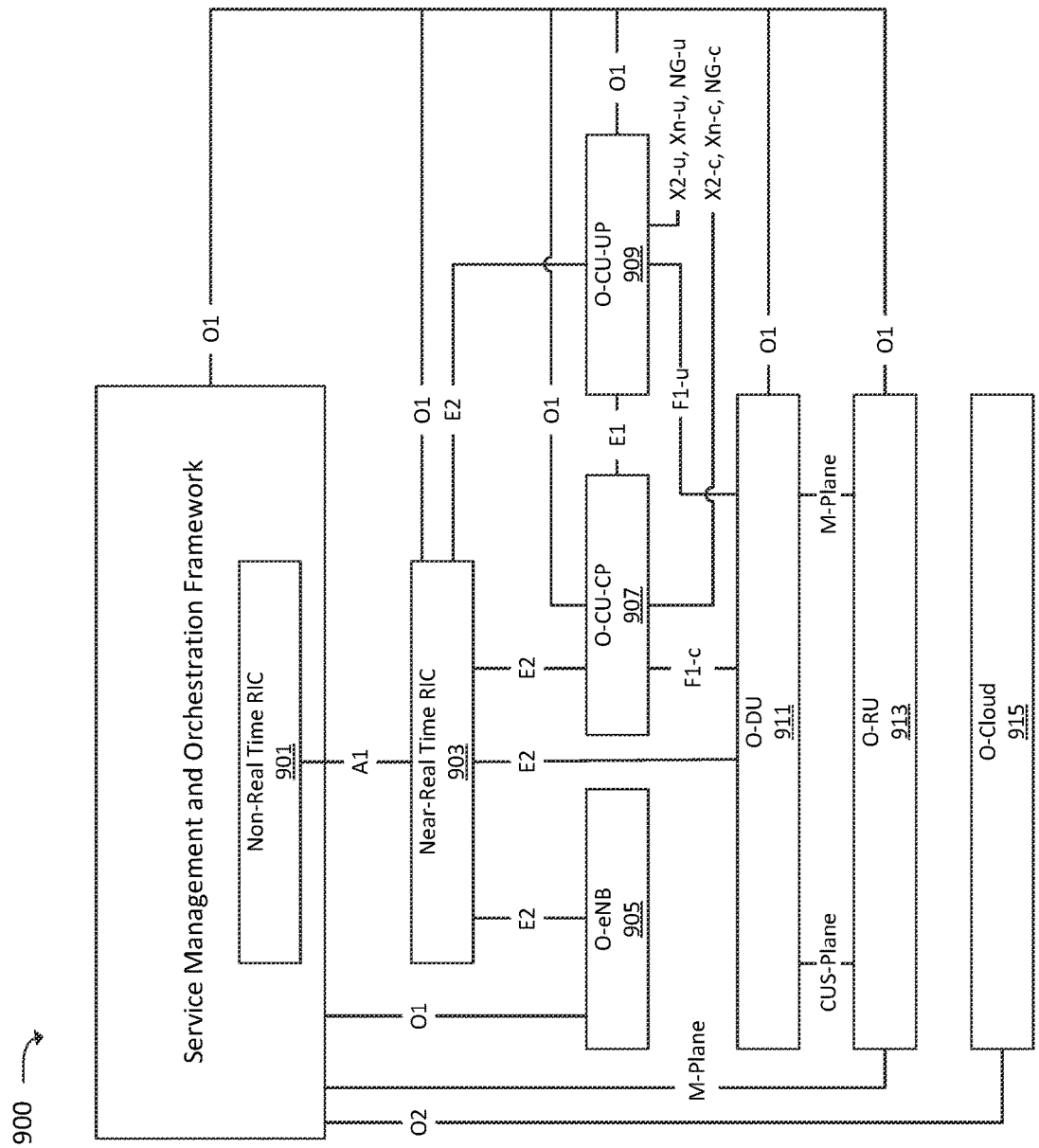
FIG. 9 illustrates an example arrangement of an Open RAN ("O-RAN") environment in which one or more embodiments, described herein, may be implemented.

FIG. 8 illustrates an example Distributed Unit ("DU") network 800, which may be included in and/or implemented by one or more RANs (e.g., RAN 710). In some embodiments, a particular RAN may include one DU network 800. In some embodiments, a particular RAN may include multiple DU networks 800. In some embodiments, DU network 800 may correspond to a particular gNB 711 of a 5G RAN (e.g., RAN 710). In some embodiments, DU network 800 may correspond to multiple gNBs 711. In some embodiments, DU network 800 may correspond to one or more other types of base stations of one or more other types of RANs. As shown, DU network 800 may include Central Unit ("CU") 805, one or more Distributed Units ("DUs") 803-1 through 803-N (referred to individually as "DU 803," or collectively as "DUs 803"), and one or more Radio Units ("RUs") 801-1 through 801-M (referred to individually as "RU 801," or collectively as "RUs 801").

CU 805 may communicate with a core of a wireless network (e.g., may communicate with one or more of the devices or systems described above with respect to FIG. 5, such as AMF 715 and/or UPF/PGW-U 735). In the uplink direction (e.g., for traffic from UEs 701 to a core network), CU 805 may aggregate traffic from DUs 803, and forward the aggregated traffic to the core network. In some embodiments, CU 805 may receive traffic according to a given protocol (e.g., Radio Link Control ("RLC")) from DUs 803, and may perform higher-layer processing (e.g., may aggregate/process RLC packets and generate Packet Data Convergence Protocol ("PDCP") packets based on the RLC packets) on the traffic received from DUs 803.

In accordance with some embodiments, CU 805 may receive downlink traffic (e.g., traffic from the core network) for a particular UE 701, and may determine which DU(s) 803 should receive the downlink traffic. DU 803 may include one or more devices that transmit traffic between a core network (e.g., via CU 805) and UE 701 (e.g., via a respective RU 801). DU 803 may, for example, receive traffic from RU 801 at a first layer (e.g., physical ("PHY") layer traffic, or lower PHY layer traffic), and may process/aggregate the traffic to a second layer (e.g., upper PHY and/or RLC). DU 803 may receive traffic from CU 805 at the second layer, may process the traffic to the first layer, and provide the processed traffic to a respective RU 801 for transmission to UE 701.

RU 801 may include hardware circuitry (e.g., one or more RF transceivers, antennas, radios, and/or other suitable hardware) to communicate wirelessly (e.g., via an RF interface) with one or more UEs 701, one or more other DUs 803 (e.g., via RUs 801 associated with DUs 803), and/or any other suitable type of device. In the uplink direction, RU 801 may receive traffic from UE 701 and/or another DU 803 via the RF interface and may provide the traffic to DU 803. In the downlink direction, RU 801 may receive traffic from DU 803, and may provide the traffic to UE 701 and/or another DU 803.

RUs 801 may, in some embodiments, be communicatively coupled to one or more Multi-Access/Mobile Edge Computing ("MEC") devices, referred to sometimes herein simply as ("MECs") 807. For example, RU 801-1 may be communicatively coupled to MEC 807-1, RU 801-M may be communicatively coupled to MEC 807-M, DU 803-1 may be communicatively coupled to MEC 807-2, DU 803-N may be communicatively coupled to MEC 807-N, CU 805 may be communicatively coupled to MEC 807-3, and so on. MECs 807 may include hardware resources (e.g., configurable or provisionable hardware resources) that may be configured to provide services and/or otherwise process traffic to and/or from UE 701, via a respective RU 801.

For example, RU 801-1 may route some traffic, from UE 701, to MEC 807-1 instead of to a core network (e.g., via DU 803 and CU 805). MEC 807-1 may process the traffic, perform one or more computations based on the received traffic, and may provide traffic to UE 701 via RU 801-1. In this manner, ultra-low latency services may be provided to UE 701, as traffic does not need to traverse DU 803, CU 805, and an intervening backhaul network between DU network 800 and the core network. In some embodiments, MEC 807 may include, and/or may implement some or all of the functionality described above with respect to Energy Saving System 105.

FIG. 7 illustrates an example O-RAN environment 900, which may correspond to RAN 510, RAN 512, and/or DU network 600. For example, RAN 510, RAN 512, and/or DU network 600 may include one or more instances of O-RAN environment 900, and/or one or more instances of O-RAN environment 900 may implement RAN 510, RAN 512, DU network 600, and/or some portion thereof. As shown, O-RAN environment 900 may include Non-Real Time Radio Intelligent Controller ("RIC") 901, Near-Real Time RIC 903, O-eNB 905, O-CU-Control Plane ("O-CU-CP") 907, O-CU-User Plane ("O-CU-UP") 909, O-DU 911, O-RU 913, and O-Cloud 915. In some embodiments, O-RAN environment 900 may include additional, fewer, different, and/or differently arranged components.

In some embodiments, some or all of the elements of O-RAN environment 900 may be implemented by one or more configurable or provisionable resources, such as virtual machines, cloud computing systems, physical servers, and/or other types of configurable or provisionable resources. In some embodiments, some or all of O-RAN environment 900 may be implemented by, and/or communicatively coupled to, one or more MECs 607.

Non-Real Time RIC 901 and Near-Real Time RIC 903 may receive performance information (and/or other types of information) from one or more sources, and may configure other elements of O-RAN environment 900 based on such performance or other information. For example, Near-Real Time RIC 903 may receive performance information, via one or more E2 interfaces, from O-eNB 905, O-CU-CP 907, and/or O-CU-UP 909, and may modify parameters associated with O-eNB 905, O-CU-CP 907, and/or O-CU-UP 909 based on such performance information. Similarly, Non-Real Time RIC 901 may receive performance information associated with O-eNB 905, O-CU-CP 907, O-CU-UP 909, and/or one or more other elements of O-RAN environment 900 and may utilize machine learning and/or other higher level computing or processing to determine modifications to the configuration of O-eNB 905, O-CU-CP 907, O-CU-UP 909, and/or other elements of O-RAN environment 900. In some embodiments, Non-Real Time RIC 901 may generate machine learning models based on performance information associated with O-RAN environment 900 or other sources, and may provide such models to Near-Real Time RIC 903 for implementation.

O-eNB 905 may perform functions similar to those described above with respect to eNB 513. For example, O-eNB 905 may facilitate wireless communications between UE 501 and a core network. O-CU-CP 907 may perform control plane signaling to coordinate the aggregation and/or distribution of traffic via one or more DUs 603, which may include and/or be implemented by one or more O-DUs 911, and O-CU-UP 909 may perform the aggregation and/or distribution of traffic via such DUs 603 (e.g., O-DUs 911). O-DU 911 may be communicatively coupled to one or more RUs 601, which may include and/or may be implemented by one or more O-RUs 913. In some embodiments, O-Cloud 915 may include or be implemented by one or more MECs 607, which may provide services, and may be communicatively coupled, to O-CU-CP 907, O-CU-UP 909, O-DU 911, and/or O-RU 913 (e.g., via an O1 and/or O2 interface).

Figure 10:
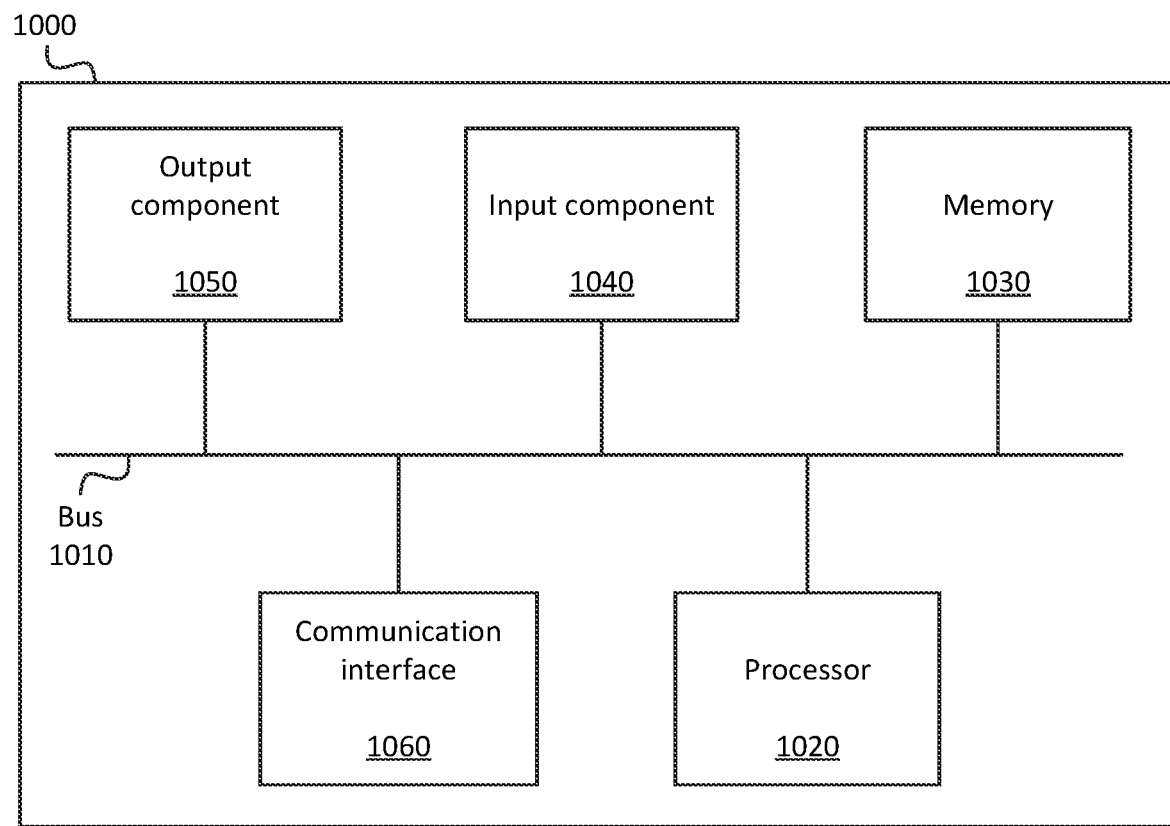
FIG. 10 illustrates example components of one or more devices, in accordance with one or more embodiments described herein.

FIG. 10 illustrates example components of device 1000. One or more of the devices described above may include one or more devices 1000. Device 1000 may include bus 1010, processor 1020, memory 1030, input component 1040, output component 1050, and communication interface 1060. In another implementation, device 1000 may include additional, fewer, different, or differently arranged components.

Bus 1010 may include one or more communication paths that permit communication among the components of device 1000. Processor 1020 may include a processor, microprocessor, or processing logic that may interpret and execute instructions. Memory 1030 may include any type of dynamic storage device that may store information and instructions for execution by processor 1020, and/or any type of non-volatile storage device that may store information for use by processor 1020.

Input component 1040 may include a mechanism that permits an operator to input information to device 1000 and/or other receives or detects input from a source external to 1040, such as a touchpad, a touchscreen, a keyboard, a keypad, a button, a switch, a microphone or other audio input component, etc. In some embodiments, input component 1040 may include, or may be communicatively coupled to, one or more sensors, such as a motion sensor (e.g., which may be or may include a gyroscope, accelerometer, or the like), a location sensor (e.g., a GPS-based location sensor or some other suitable type of location sensor or location determination component), a thermometer, a barometer, and/or some other type of sensor. Output component 1050 may include a mechanism that outputs information to the operator, such as a display, a speaker, one or more light emitting diodes ("LEDs"), etc.

Communication interface 1060 may include any transceiver-like mechanism that enables device 1000 to communicate with other devices and/or systems. For example, communication interface 1060 may include an Ethernet interface, an optical interface, a coaxial interface, or the like. Communication interface 1060 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 1000 may include more than one communication interface 1060. For instance, device 1000 may include an optical interface and an Ethernet interface.

Device 1000 may perform certain operations relating to one or more processes described above. Device 1000 may perform these operations in response to processor 1020 executing software instructions stored in a computer-readable medium, such as memory 1030. A computer-readable medium may be defined as a non-transitory memory device. A memory device may include space within a single physical memory device or spread across multiple physical memory devices. The software instructions may be read into memory 1030 from another computer-readable medium or from another device. The software instructions stored in memory 1030 may cause processor 1020 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

For example, while series of blocks and/or signals have been described above (e.g., with regard to FIGS. 1A, 1B, and 2-6), the order of the blocks and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

The actual software code or specialized control hardware used to implement an embodiment is not limiting of the embodiment. Thus, the operation and behavior of the embodiment has been described without reference to the specific software code, it being understood that software and control hardware may be designed based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Further, while some devices are shown as communicating with a network, some such devices may be incorporated, in whole or in part, as a part of the network.

To the extent the aforementioned implementations collect, store, or employ personal information provided by individuals, it should be understood that such information shall be collected, stored, and used in accordance with all applicable laws concerning protection of personal information. Additionally, the collection, storage, and use of such information may be subject to consent of the individual to such activity (for example, through "opt-in" or "opt-out" processes, as may be appropriate for the situation and type of information). Storage and use of personal information may be in an appropriately secure manner reflective of the type of information, for example, through various encryption and anonymization techniques for particularly sensitive information.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A device, comprising:
  one or more processors configured to:
    generate or receive a plurality of models that associate respective Quality of Service ("QoS") metrics, energy consumption metrics, and sets of actions;
    receive a set of QoS metrics associated with a particular portion of a radio access network ("RAN");
    receive a set of energy consumption metrics associated with the portion of the RAN;
    determine, based on the received sets of QoS metrics and energy consumption metrics, a particular model, of the plurality of models, that is associated with the portion of the RAN;
    identify the respective set of actions associated with the particular model; and
    implement the set of actions, associated with the particular model, at the portion of the RAN.

2. The device of claim 1, wherein the set of actions include one or more energy saving techniques.

3. The device of claim 1, wherein implementing the set of actions includes at least one of:

modifying, in a time domain, an amount of radio frequency ("RF") transmissions associated with the portion of the RAN, or modifying, in a frequency domain, an amount of radio frequency ("RF") transmissions associated with the portion of the RAN.

4. The device of claim 1, wherein the implementing the set of actions includes modifying at least one of:
an azimuth angle of one or more beams associated with the portion of the RAN,
a beam width of the one or more beams, or
a beam power of the one or more beams.

5. The device of claim 1, wherein the QoS metrics include QoS metrics associated with one or more User Equipment ("UEs") that receive wireless service via the portion of the RAN.

6. The device of claim 1, wherein the set of QoS metrics is a first set of QoS metrics, wherein the set of energy consumption metrics is a first set of energy consumption metrics, wherein the one or more processors are further configured to:
receive, after implementing the set of actions, a second set of QoS metrics and a second set of energy consumption metrics associated with the portion of the RAN; and
modify an association between the portion of the RAN and the particular model based on the second set of QoS metrics and the second set of energy consumption metrics received after implementing the set of actions.

7. The device of claim 6, wherein the one or more processors are further configured to determine that the second set of QoS metrics do not meet a set of threshold values, and
wherein modifying the association between the portion of the RAN and the particular model includes weakening an association between the portion of the RAN and the particular model.

8. A non-transitory computer-readable medium comprising a plurality of processor-executable instructions, which when executed by a processor, cause the processor to:
generate or receive a plurality of models that associate respective Quality of Service ("QoS") metrics, energy consumption metrics, and sets of actions;
receive a set of QoS metrics associated with a particular portion of a radio access network ("RAN");
receive a set of energy consumption metrics associated with the portion of the RAN;
determine, based on the received sets of QoS metrics and energy consumption metrics, a particular model, of the plurality of models, that is associated with the portion of the RAN;
identify the respective set of actions associated with the particular model; and
implement the set of actions, associated with the particular model, at the portion of the RAN.

9. The non-transitory computer-readable medium of claim 8, wherein the set of actions include one or more energy saving techniques.

10. The non-transitory computer-readable medium of claim 8, wherein implementing the set of actions includes at least one of:
modifying, in a time domain, an amount of radio frequency ("RF") transmissions associated with the portion of the RAN, or
modifying, in a frequency domain, an amount of radio frequency ("RF") transmissions associated with the portion of the RAN.

11. The non-transitory computer-readable medium of claim 8, wherein the implementing the set of actions includes modifying at least one of:
an azimuth angle of one or more beams associated with the portion of the RAN,
a beam width of the one or more beams, or
a beam power of the one or more beams.

12. The non-transitory computer-readable medium of claim 8, wherein the QoS metrics include QoS metrics associated with one or more User Equipment ("UEs") that receive wireless service via the portion of the RAN.

13. The non-transitory computer-readable medium of claim 8, wherein the set of QoS metrics is a first set of QoS metrics, wherein the set of energy consumption metrics is a first set of energy consumption metrics, wherein the plurality of processor-executable instructions further include processor-executable instructions to:
receive, after implementing the set of actions, a second set of QoS metrics and a second set of energy consumption metrics associated with the portion of the RAN; and
modify an association between the portion of the RAN and the particular model based on the second set of QoS metrics and the second set of energy consumption metrics received after implementing the set of actions.

14. The non-transitory computer-readable medium of claim 13, wherein the plurality of processor-executable instructions further include processor-executable instructions to determine that the second set of QoS metrics do not meet a set of threshold values, and
wherein modifying the association between the portion of the RAN and the particular model includes weakening an association between the portion of the RAN and the particular model.

15. A method, comprising:
generating or receiving, by a network device, a plurality of models that associate respective Quality of Service ("QoS") metrics, energy consumption metrics, and sets of actions;
receiving, by the network device, a set of QoS metrics associated with a particular portion of a radio access network ("RAN");
receiving, by the network device, a set of energy consumption metrics associated with the portion of the RAN;
determining, by the network device, based on the received sets of QoS metrics and energy consumption metrics, a particular model, of the plurality of models, that is associated with the portion of the RAN;
identifying, by the network device, the respective set of actions associated with the particular model; and
implementing the set of actions, associated with the particular model, at the portion of the RAN.

16. The method of claim 15, wherein the set of actions include one or more energy saving techniques.

17. The method of claim 15, wherein implementing the set of actions includes at least one of:
modifying, in a time domain, an amount of radio frequency ("RF") transmissions associated with the portion of the RAN, or
modifying, in a frequency domain, an amount of radio frequency ("RF") transmissions associated with the portion of the RAN.

18. The method of claim 15, wherein the implementing the set of actions includes modifying at least one of:
an azimuth angle of one or more beams associated with the portion of the RAN, a beam width of the one or more beams, or a beam power of the one or more beams.

19. The method of claim 15, wherein the QoS metrics include QoS metrics associated with one or more User Equipment ("UEs") that receive wireless service via the portion of the RAN.

20. The method of claim 15, wherein the set of QoS metrics is a first set of QoS metrics, wherein the set of energy consumption metrics is a first set of energy consumption metrics, wherein the method further comprises:

receiving, after implementing the set of actions, a second set of QoS metrics and a second set of energy consumption metrics associated with the portion of the RAN; and modifying an association between the portion of the RAN and the particular model based on the second set of QoS metrics and the second set of energy consumption metrics received after implementing the set of actions.

\* \* \* \* \*